(12) United States Patent
O'Hare

(10) Patent No.: US 8,672,200 B2
(45) Date of Patent: Mar. 18, 2014

(54) TAILGATING SYSTEM

(76) Inventor: Matthew J. O'Hare, San Francisco, CA (US)

( * ) Notice: Subject to any disclaimer, the term of this patent is extended or adjusted under 35 U.S.C. 154(b) by 887 days.

(21) Appl. No.: 12/654,882

(22) Filed: Jan. 7, 2010

(65) Prior Publication Data

US 2010/0176170 A1    Jul. 15, 2010

Related U.S. Application Data

(60) Provisional application No. 61/143,615, filed on Jan. 9, 2009.

(51) Int. Cl.
*B60R 9/06* (2006.01)
*B60R 11/00* (2006.01)
*B60D 1/46* (2006.01)

(52) U.S. Cl.
USPC ......... 224/519; 224/520; 224/527; 280/490.1

(58) Field of Classification Search
USPC .......... 224/519, 525, 521, 520, 531; 414/462; 280/490.1
See application file for complete search history.

(56) References Cited

U.S. PATENT DOCUMENTS

| | | | | |
|---|---|---|---|---|
| 2,609,221 | A * | 9/1952 | Schultz | 292/251.5 |
| 3,232,489 | A * | 2/1966 | Buffington | 222/108 |
| 3,367,698 | A * | 2/1968 | Walker, Sr. | 292/188 |
| 3,400,949 | A * | 9/1968 | Kendall | 280/490.1 |
| 3,554,578 | A * | 1/1971 | Reed | 280/490.1 |
| 3,692,330 | A * | 9/1972 | Kendall | 280/402 |
| 3,708,183 | A * | 1/1973 | Jones | 280/483 |
| 3,865,406 | A * | 2/1975 | Dutton | 280/490.1 |
| 3,922,006 | A * | 11/1975 | Borges | 280/416.1 |
| 4,089,554 | A * | 5/1978 | Myers | 296/37.1 |
| 4,103,928 | A * | 8/1978 | Sheppard, Jr. | 280/490.1 |
| 4,108,055 | A * | 8/1978 | Simmons | 99/421 H |
| 4,263,854 | A * | 4/1981 | Moore et al. | 108/37 |
| 4,757,755 | A * | 7/1988 | Sarten | 99/357 |
| 4,840,118 | A * | 6/1989 | Rinehart | 99/446 |
| 5,640,949 | A * | 6/1997 | Smith | 126/276 |
| 5,647,618 | A * | 7/1997 | Lamberth | 292/19 |
| D460,656 | S * | 7/2002 | Caulder | D7/332 |
| 6,585,280 | B1 * | 7/2003 | Wiers | 280/468 |
| 6,725,855 | B1 * | 4/2004 | Brennan | 126/41 R |
| 6,726,237 | B1 * | 4/2004 | Carrico | 280/490.1 |
| 6,802,441 | B1 | 10/2004 | DuRant et al. | |
| 6,814,383 | B2 * | 11/2004 | Reed et al. | 296/24.3 |
| 6,851,820 | B2 * | 2/2005 | Choi et al. | 362/92 |
| 6,877,505 | B1 * | 4/2005 | Den Hoed | 126/276 |
| D508,221 | S * | 8/2005 | Rebick | D12/162 |
| 7,207,589 | B2 * | 4/2007 | Givens | 280/477 |
| 7,263,990 | B1 * | 9/2007 | Lenhart | 126/276 |
| D555,549 | S * | 11/2007 | Capuano | D12/162 |
| 7,425,013 | B1 * | 9/2008 | Bartlett | 280/479.3 |
| 7,451,709 | B2 * | 11/2008 | Swartfager et al. | 108/14 |

(Continued)

*Primary Examiner* — Justin Larson
*Assistant Examiner* — Lester L Vanterpool
(74) *Attorney, Agent, or Firm* — Nixon & Vanderhye, P.C.

(57) ABSTRACT

A tailgating system for attachment to a transport vehicle includes a cabinet configured to include at least one of a refrigerator, a grill, a draft system, and a dry storage cabinet. A movable hitch assembly includes a hitch coupling configured to be coupled to a hitch ball connectable to the transport vehicle. The movable hitch assembly is configured to move the hitch coupling up and down relative to the cabinet to raise and lower the cabinet when the movable hitch assembly is coupled to the transport vehicle.

25 Claims, 37 Drawing Sheets

(56) References Cited

U.S. PATENT DOCUMENTS

| | | | |
|---|---|---|---|
| 7,591,404 B2 * | 9/2009 | LeDuc et al. | 224/509 |
| 7,753,394 B2 * | 7/2010 | Monostori et al. | 280/490.1 |
| 8,061,572 B2 * | 11/2011 | Myrex | 224/502 |
| 2002/0043259 A1 | 4/2002 | Brennan | |
| 2004/0026946 A1 | 2/2004 | Reed, III et al. | |
| 2006/0016447 A1 * | 1/2006 | Meyer | 126/276 |
| 2006/0202594 A1 | 9/2006 | DeMars | |
| 2008/0098902 A1 * | 5/2008 | Mansfield et al. | 99/339 |
| 2008/0163862 A1 * | 7/2008 | Cartwright | 126/25 R |
| 2010/0007157 A1 * | 1/2010 | Teuthorn et al. | 292/340 |
| 2010/0307179 A1 * | 12/2010 | Fava | 62/262 |

* cited by examiner

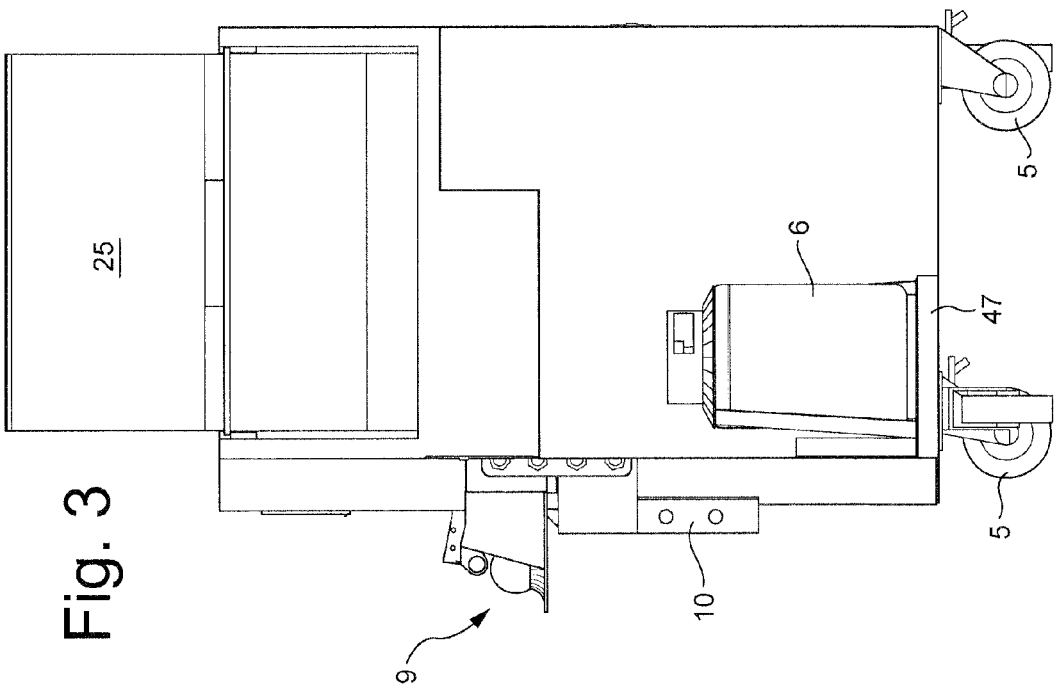
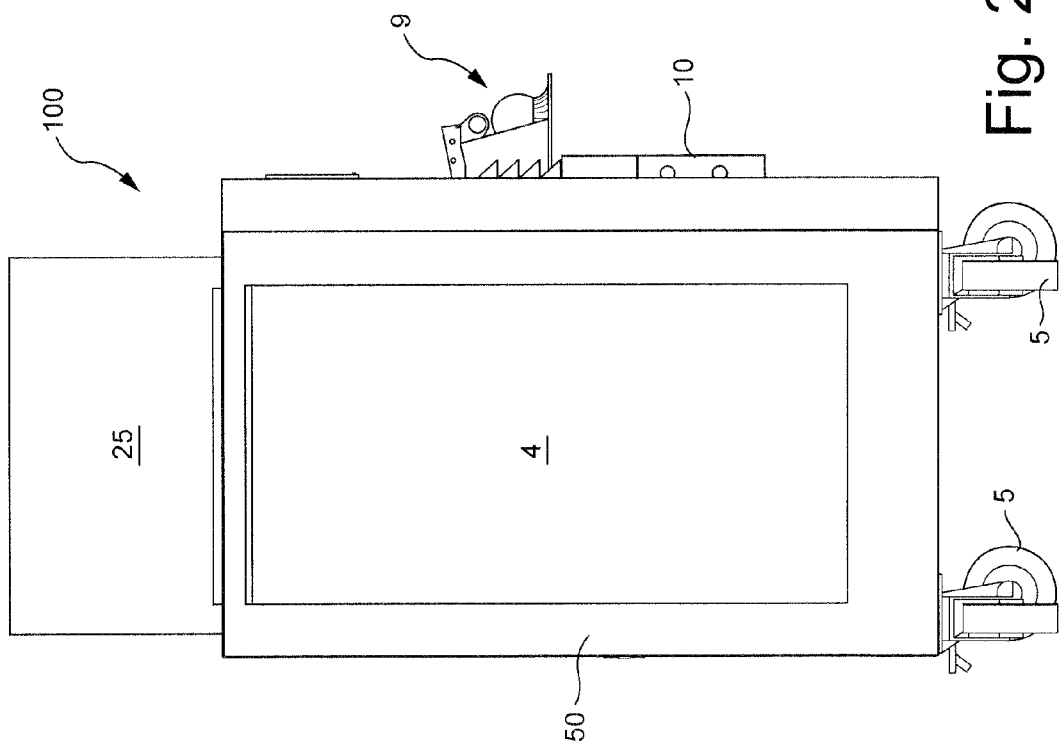

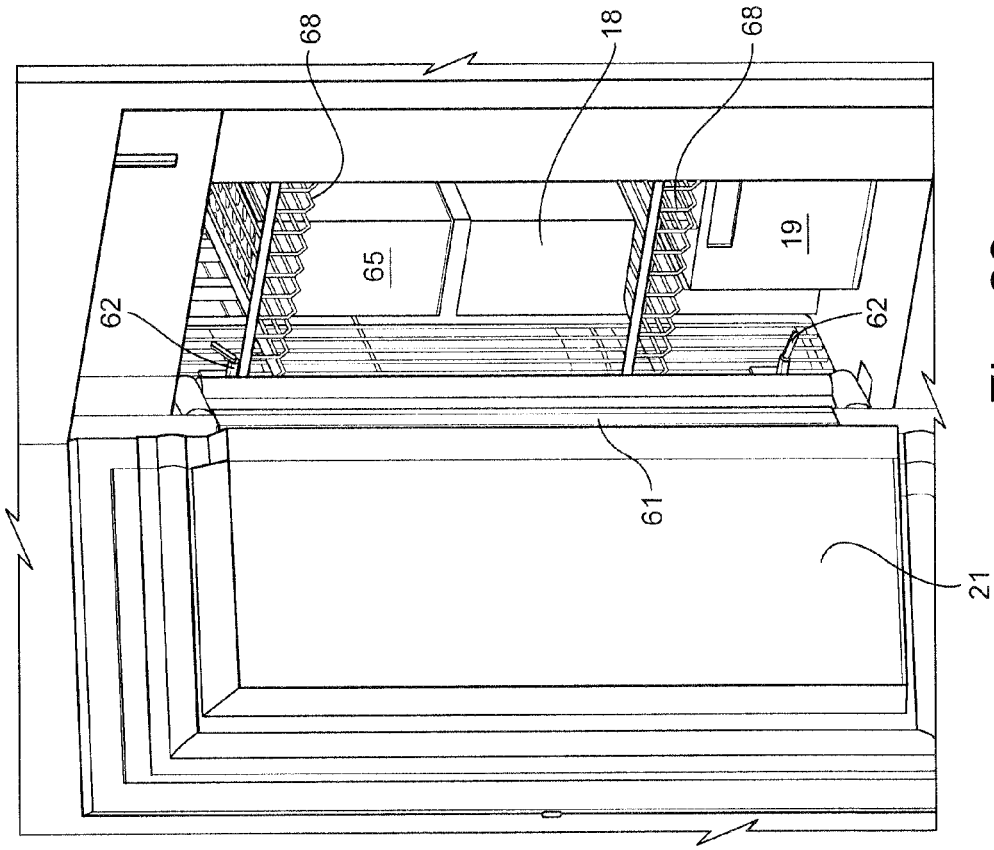
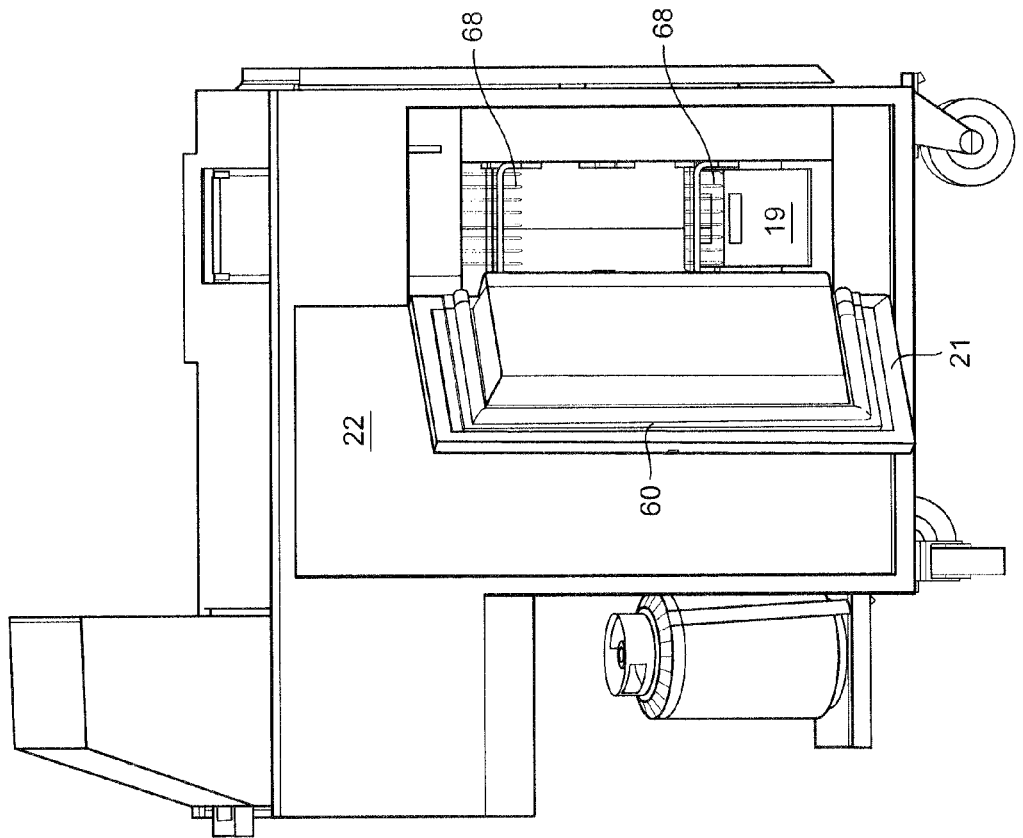

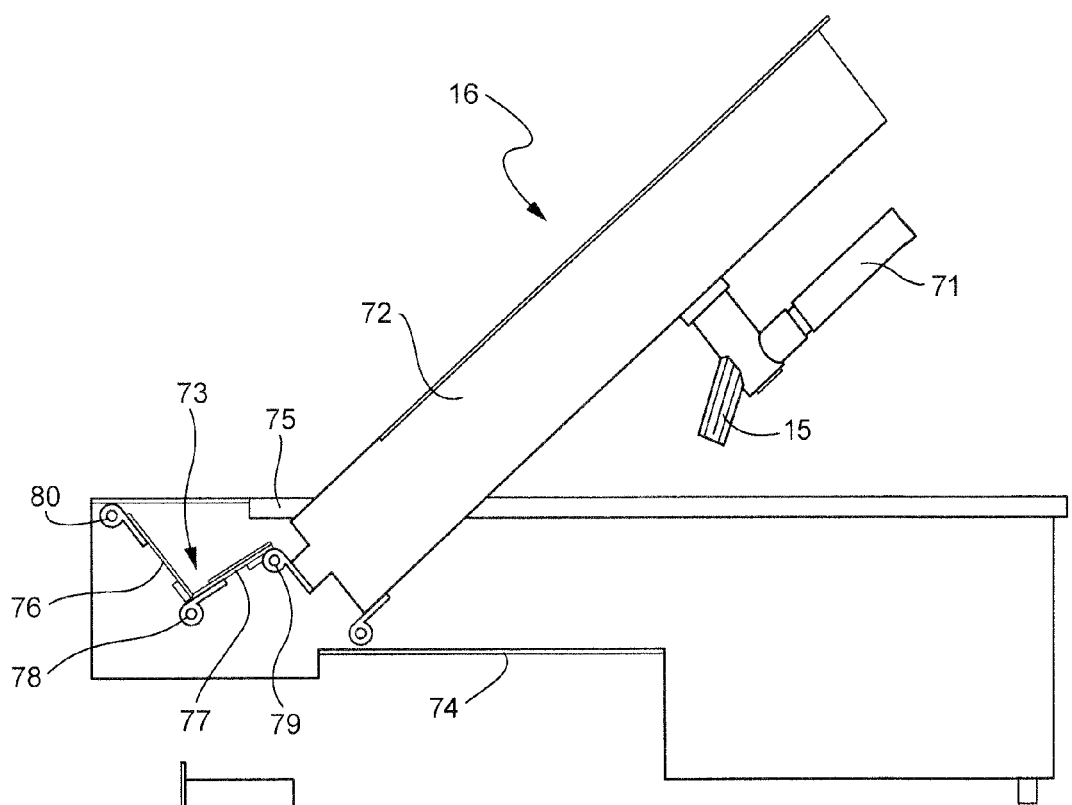
Fig. 37
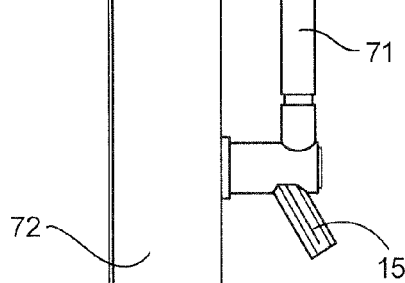
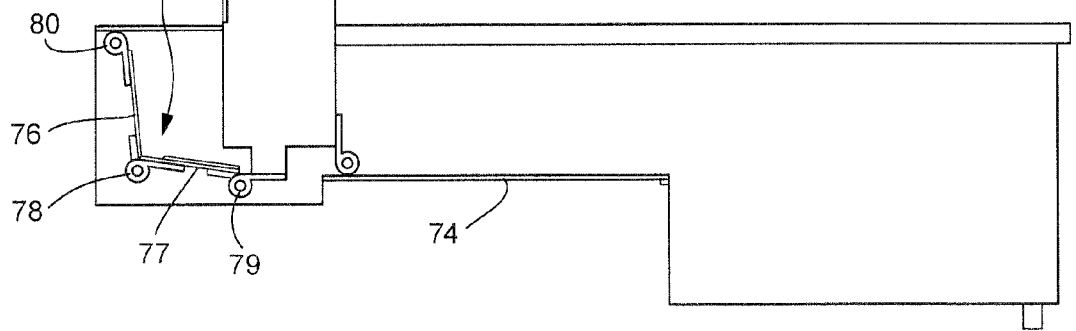
Fig. 38

TAILGATING SYSTEM

CROSS REFERENCE TO RELATED APPLICATION

This application claims the benefit of U.S. Application 61/143,615, filed Jan. 9, 2009, the entire contents of which are incorporated herein by reference.

FIELD OF THE INVENTION

The invention generally relates to a tailgating system for use in the preparation and enjoyment of food and beverages at a sporting or outdoor event.

BACKGROUND OF THE INVENTION

Tailgaters currently do not have a means to consolidate, store, or transport all of their activities and supplies. Additionally, tailgaters are limited in the activities that they can perform and features they can enjoy. The tailgating system of the invention provides refrigeration, draft beer, dry storage, electrical power, and streamlined transportation and storage of tailgating materials in a compact and secure package. The tailgating system of the invention gives tailgaters an alternative to using supplies and methods obtained from various locations and replaces them with a standardized tailgating package.

SUMMARY OF THE INVENTION

According to one aspect, the tailgating system is a packaged entertainment unit for use during tailgating events. The tailgating system may include:

1. A gas, e.g. propane, grill system mounted on a lockable sliding shelf;
2. A locking system to secure the grill system in a closed position and the gas valve in an off position;
3. A mounted gas, e.g. propane, tank and connection to the grill;
4. A draft beer refrigeration system;
5. A draft beer dispensing system, for connection to a draft beer keg or barrel, that folds down into a locking position for storage where the dispensing system becomes flush with the tailgating system's top surface so that it can be use as a counter top surface;
6. A refrigerated storage system integrated into a cabinet apparatus that includes an ice storage bin, a location to store a standard carbon dioxide cylinder for use with the draft beer refrigeration system, and a shelving system with adjustable racks for cold storage;
7. Two side-by-side refrigerator doors where one door is hinged both to the cabinet apparatus and the second refrigerator door;
8. A cabinet apparatus including a counter top surface;
9. Dry storage spaces in the form of locking cabinets;
10. A folding table to expand the surface area of the countertop;
11. Pneumatic castor wheels for movement of the cabinet apparatus on ground by hand;
12. A vertical ball hitch assembly that includes a two-position vertical securing post for connection to vehicles of varying heights;
13. A vertical securing sleeve for connection to the vertical ball hitch assembly to limit movement during vehicular travel;
14. An integrated motorized hitch assembly for raising and lowering of the cabinet apparatus when attached to the vertical ball hitch assembly;
15. An electric linear actuator to move the motorized hitch assembly;
16. A connection to a vehicle trailer hitch receiver for transportation via the vertical ball hitch assembly;
17. AC power for 120 V, AC outlets (e.g. for appliances), a refrigerator, and motorized hitch assembly;
18. DC power for 12 V DC outlets (e.g. for appliances);
19. A battery storage and supply system;
20. A power inverter for converting power from direct current to alternating current;
21. A power connection to draw power, as auxiliary power, from an automobile through a trailer hitch light connection;
22. A battery charger system to recharge supply batteries from a 120 V, AC wall connection;
23. A lighting system for aesthetics and visibility when operating the system;
24. An electrical control panel for operating the system (i.e., lights, motorized hitch, refrigeration storage system, power supply systems);
25. AC and DC receptacles to power appliances and equipment to be used during tailgating functions; and/or
26. A motorized hitch assembly to raise and lower the tailgating system from a vehicle hitch for the purpose of transporting to desired location of use.

According to other aspects, the tailgating system may be used to:

1. Grill on a grill that is supplied by a gas tank stored in the system;
2. Refrigerate and dispense draft beer from a keg;
3. Store refrigerated items in a refrigerated storage system where shelves can be adjusted to accommodate items;
4. Store ice in the refrigerated storage system;
5. Provide tabletop space to be used as a bar countertop, a kitchen countertop, an eating countertop, a gathering point for social activities, and/or any other functions desired by a user(s) of the system;
6. Provide dry storage space to hold supplies to be used during tailgating functions.

According to another aspect, a typical sequence of operations for the tailgating system may include:

1. Storage in a garage when not in use and/or connection to a 120 V AC wall receptacle which supplies a battery charger with power. The battery charger automatically recharges and maintains the storage batteries at 12 V DC. The wall receptacle also supplies power to the refrigeration system to keep the keg and any other refrigerated items cool while the tailgating system is not in use. The dry storage spaces hold any other tailgating items while the tailgating system is not use.
2. When a user decides to use the tailgating system, the 120 V AC wall connection may be unplugged and stowed onboard the tailgating system. The tailgating system, standing on pneumatic castor wheels, may be manually wheeled by the user to an automobile's receiver hitch.
3. The user may attach the vertical ball hitch assembly (while it is not connected to the tailgating system) to the automobile receiver hitch.
4. The user may switch the battery power to supply power to the motorized hitch assembly. The user may depress "raise" and "lower" buttons to raise and lower the motorized hitch assembly to the desired height. Upon positioning the motorized hitch in line and slightly above the vertical ball hitch assembly, the user may depress the "raise" button. This action may lower the motorized hitch assembly. The downward action of the motorized hitch assembly acting against the vertical ball hitch assembly raises the tailgating system off of the ground. As a result, the automobile now carries the load of the tailgating system via the receiver hitch. The user also connects the tailgating system to the vehicle's trailer hitch power outlet.

5. The user may switch the battery power so that power is supplied by the automobile's battery and/or alternator while the vehicle is operating and/or traveling. An automatic safety is built into the tailgating system so that the tailgating system does not draw power if the automobile's battery is below 11 V. This ensures that the automobile has enough power to start the engine and that the tailgating system may not inadvertently drain the automobile's battery. While the user is traveling to the tail gate location, the automobile may supply the power to operate the refrigeration system so that the tailgating system's supply batteries are not used.

6. When the user arrives to the tail gate location, the user may switch the battery power to supply the motorized hitch assembly. The "lower" button may be depressed. Opposite to the action in Step 4, the motorized hitch assembly may raise up causing the tailgating system to lower. Once the tailgating system contacts the ground the motorized hitch assemble may continue to raise until it clears the ball mount of the vertical ball hitch assembly. The ground now carries the load of the tailgating system.

7. A battery supply system built into the tailgating system is the primary power supply. The battery supply system supplies the tailgating system all the power needed to operate all functions (i.e., operate refrigeration system, supply power to AC and DC receptacles, operate the motorized hitch assembly, and operate lights).

According to other aspects:

1. The trailer hitch electrical connection has an extension cord so that a power connection can be maintained between the vehicle's trailer hitch power outlet and the tailgating system, even when the tailgating system is removed from the hitch. This power supply is considered as a back up. The built in automatic safety system may prevent the car battery from being drained below 11 V by the tailgating system.

2. After the user has established the tailgating location, the tailgating system can be used. The storage locker under the grill can be unlocked and opened to access the grill slide release. After the grill is released from the stowed position, it can be pulled out for use. The grill hood is attached to the back wall of the grill base via a hinge. Retainer tabs prevent the grill hood from being opened while in the stowed position, and the grill can only be opened after it has been pulled out. Additionally, the gas valve that regulates the amount of propane delivered to the grill burners remains hidden and can not be operated while the grill is stowed. The gas valve can only be operated when the grill is pulled out from the storage position. The gas valve is connected to a propane tank.

3. Below the grill, dry storage space is available for the user.

4. The user may also use the draft beer refrigeration and dispensing system and the refrigerated storage system. A refrigerator integrated into the tailgating system's cabinet can hold a half barrel keg which is supplied by the user as well as any refrigerated items supplied by the user. In the stowed position, the draft tower of the dispensing system remains folded, locked down, and flush with the counter top of the tailgating system. To operate the draft beer system, the user unlocks the draft tower apparatus and folds it up to an upright and locked position. A drain is located to remove any access liquid from operating the draft tower.

5. A folding table is connected to the tailgating system on the side opposite the grill via a hinge. This table is locked in place during travel and is propped up for use during tailgating. This table, in addition to the countertop space surrounding the draft tower, may be used for multiple functions by the user.

6. During the tailgating event, the user may also have access to dry storage spaces. The user may store items to be used during the tailgating event. Items may be easily accessed through cabinet doors.

7. The user may also have the option to light the tailgating area. Lights may be positioned to illuminate the grilling area, the draft beer dispensing area, the interior of cabinet spaces, and underneath the tailgating system.

8. When the user is finished with the tailgating event, the tailgating system may be stored. The grill may be stored in the opposite manner described in item 2, the folding table may be folded and secured in the opposite manner described in item 5, and the draft tower may be closed and secured in the opposite manner described in item 4. The tailgating system may be manually moved to the vicinity of the vertical ball hitch assembly (while it is connected to the automobile receiver hitch). The user may switch the battery power to supply power to the motorized hitch assembly. The user may then secure the tailgating system to the vehicle and transport it similar to the manner described in items 3, 4, and 5 when returning the tailgating system to the user's garage (or other place of storage).

9. When the user arrives at the storage location, the user may remove the tailgating system from the vertical ball hitch assembly similar to the manner described in item 6.

10. The user may then stow the tailgating system opposite the manner described in item 2 to return the tailgating system to the position described in item 1.

BRIEF DESCRIPTION OF THE DRAWINGS

Sample embodiments of the tailgating system may be described with reference to the attached drawings, in which like reference numbers denote like features, and wherein:

FIG. 2 schematically depicts a right side view of the tailgating system of FIG. 1;

FIG. 3 schematically depicts a left side view of the tailgating system of FIG. 1;

FIG. 28 schematically depicts the tailgating system with the right door of the refrigerated space open;

FIG. 29 schematically depicts the tabs for the left door of the refrigerated space;

FIG. 37 schematically depicts a side view of the draft tower opening from the closed position to the open position;

FIG. 38 schematically depicts a side view of the draft tower in the open position;

DETAILED DESCRIPTION OF ILLUSTRATED EMBODIMENTS

Figure 1:
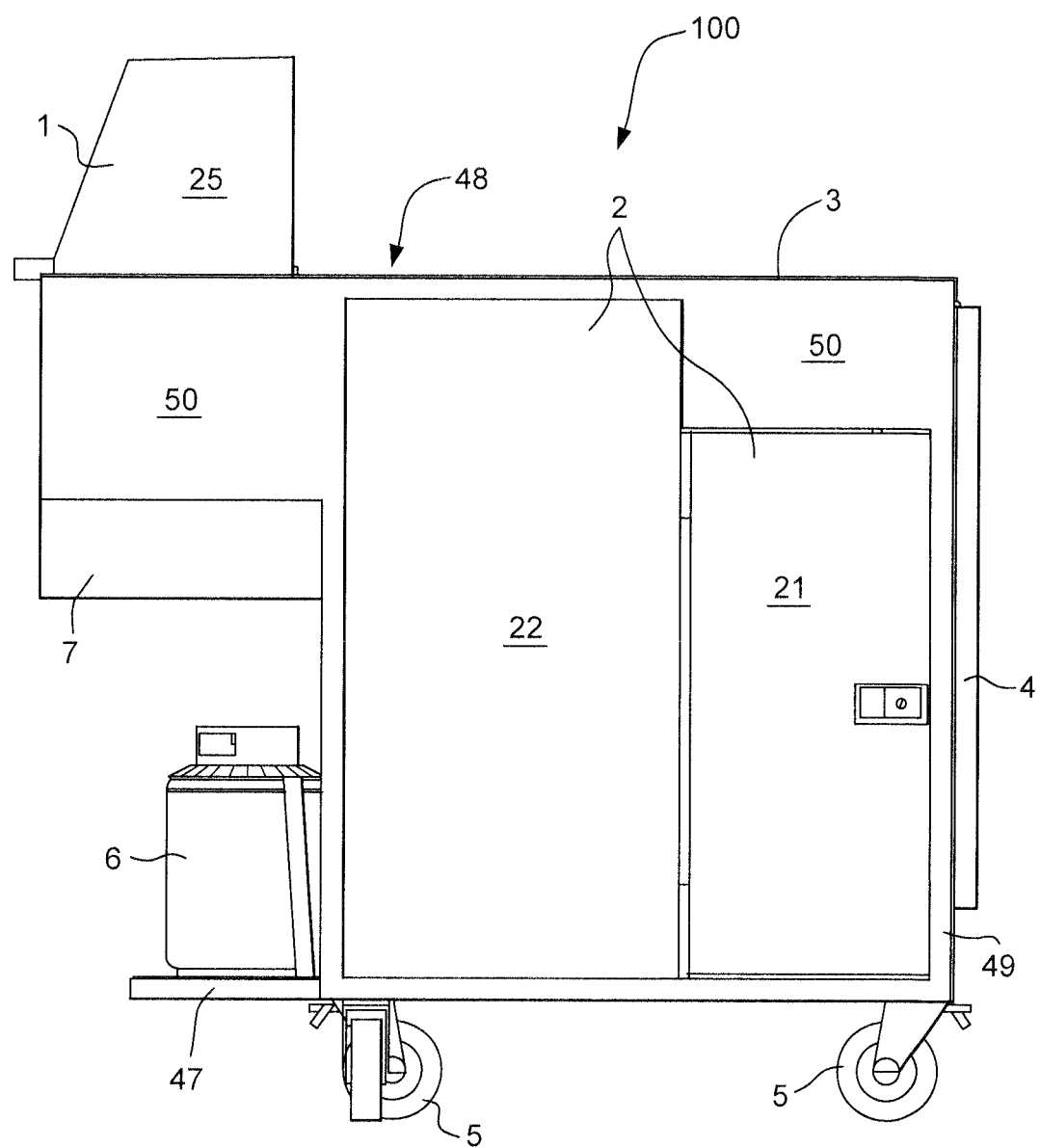
FIG. 1 schematically depicts a front view of a sample embodiment of the tailgating system.
Figure 4:
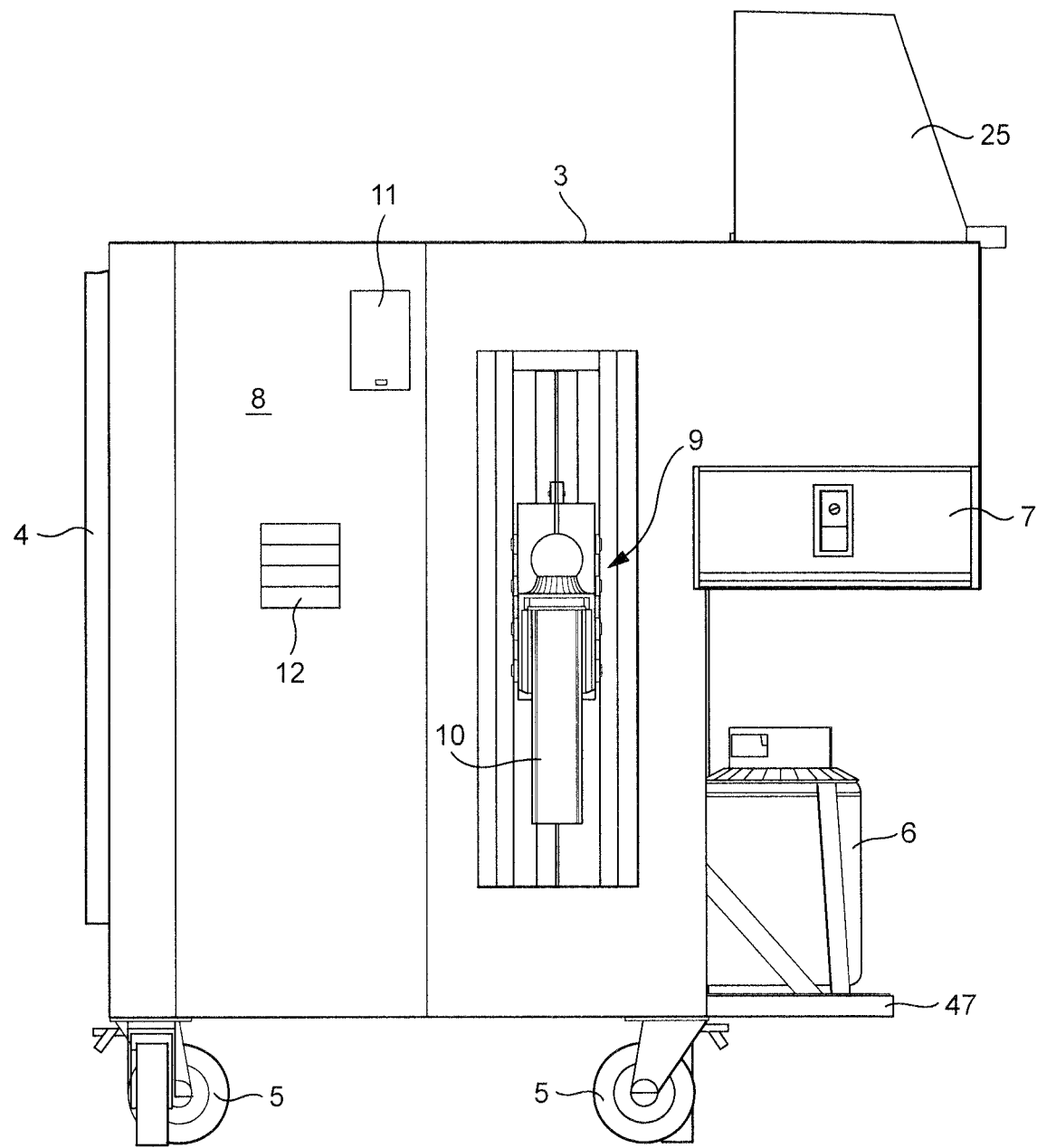
FIG. 4 schematically depicts a rear view of the tailgating system of FIG. 1.
Figure 5:
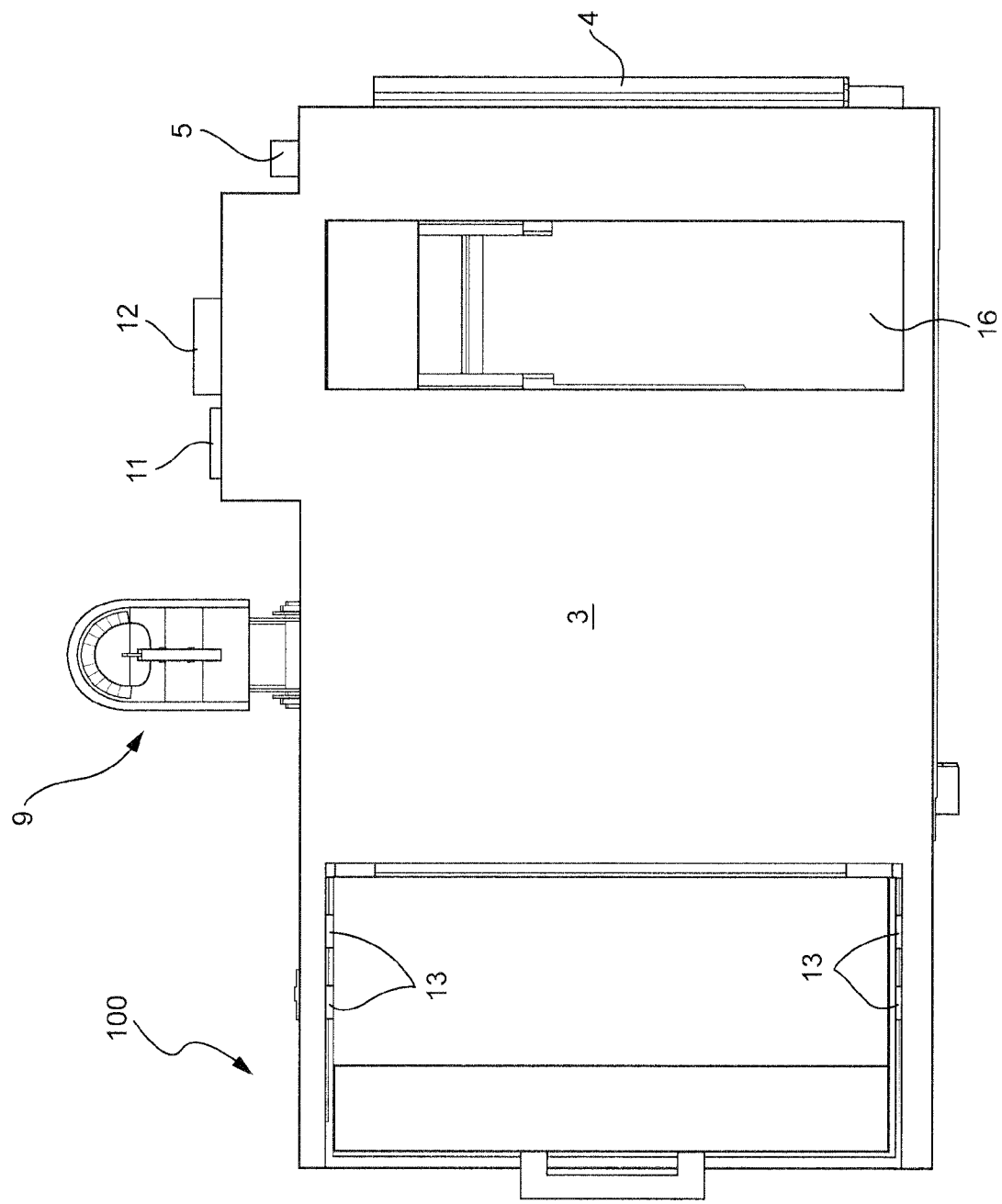
FIG. 5 schematically depicts a top view of the tailgating system of FIG. 1.
Figure 6:
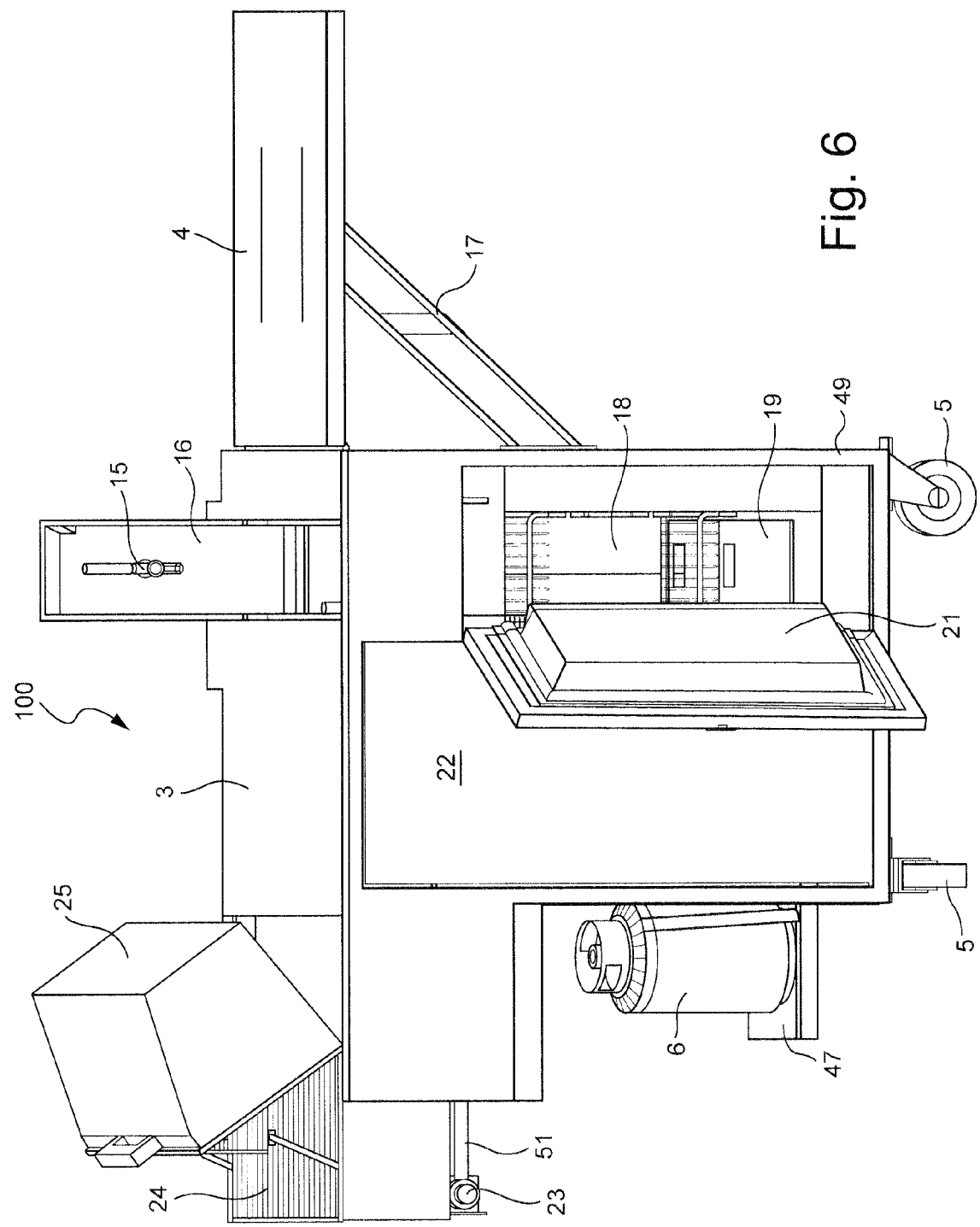
FIG. 6 schematically depicts a perspective view of the tailgating system of FIG. 1 with various features accessed (including one side of the refrigerated space)
Figure 7:
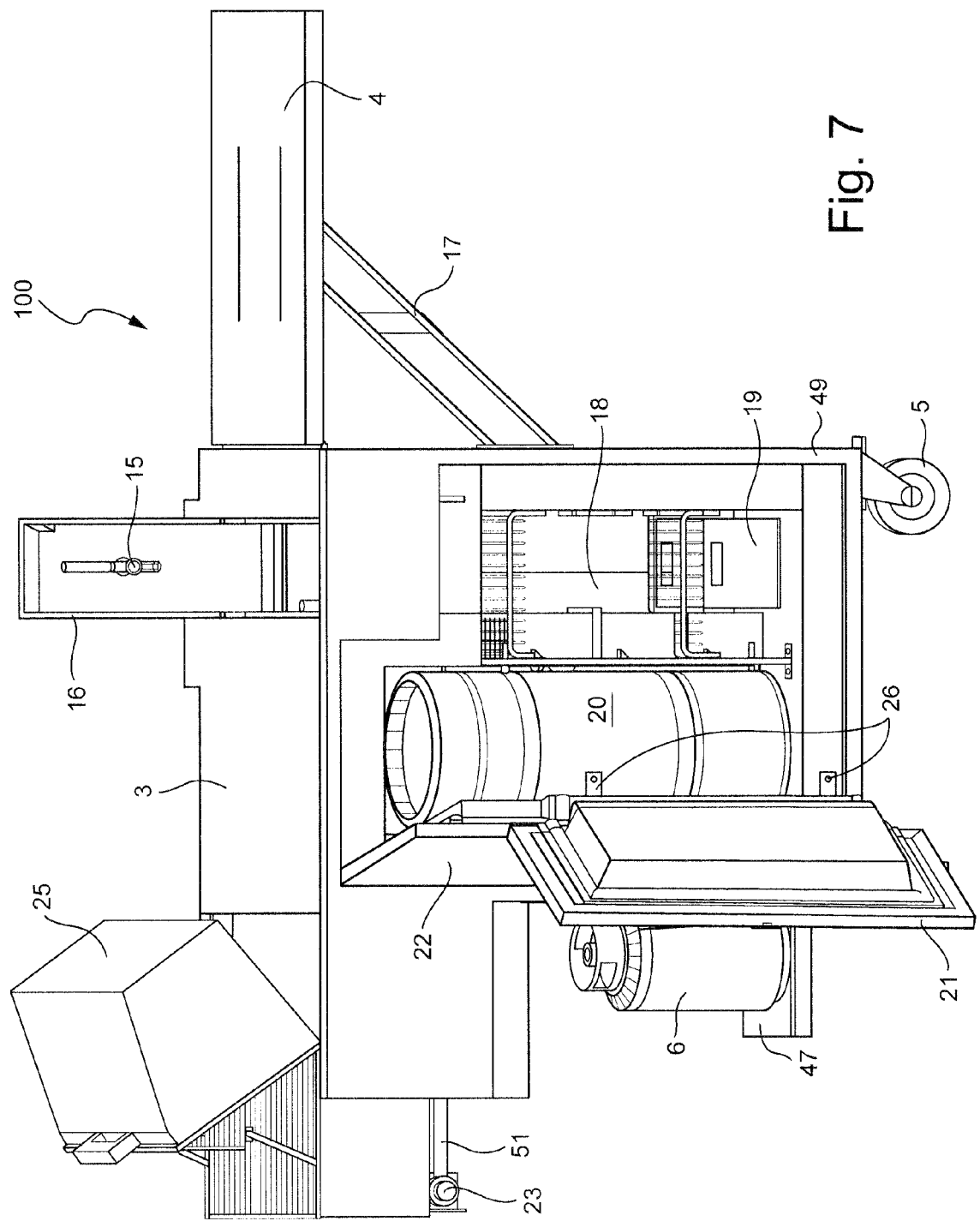
FIG. 7 schematically depicts a perspective view of the tailgating system of FIG. 6 with both sides of the refrigerated space accessed.
Figure 8:
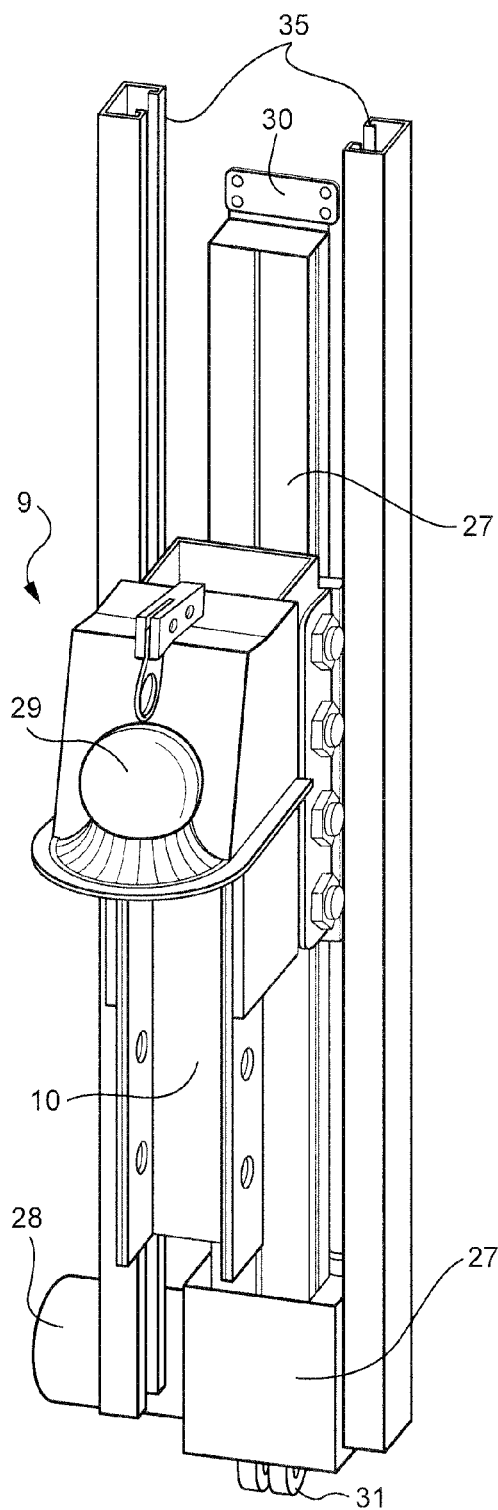
FIG. 8 schematically depicts a hitch assembly and actuator for use with the tailgating system of FIG. 1.
Figure 9:
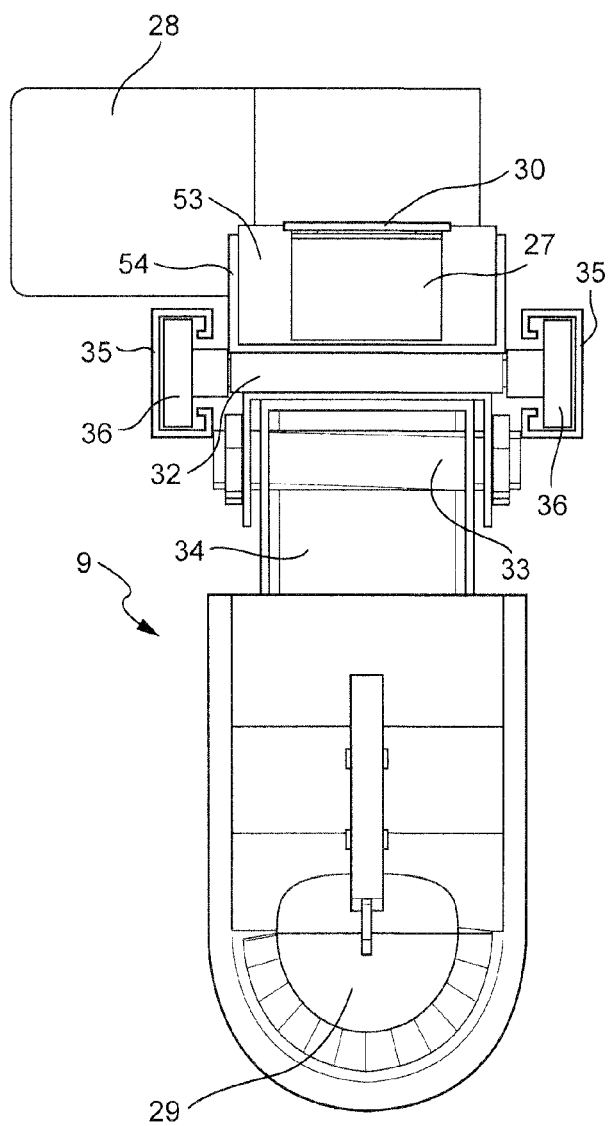
FIG. 9 schematically depicts a top view of the hitch assembly and actuator of FIG. 8.
Figure 10:
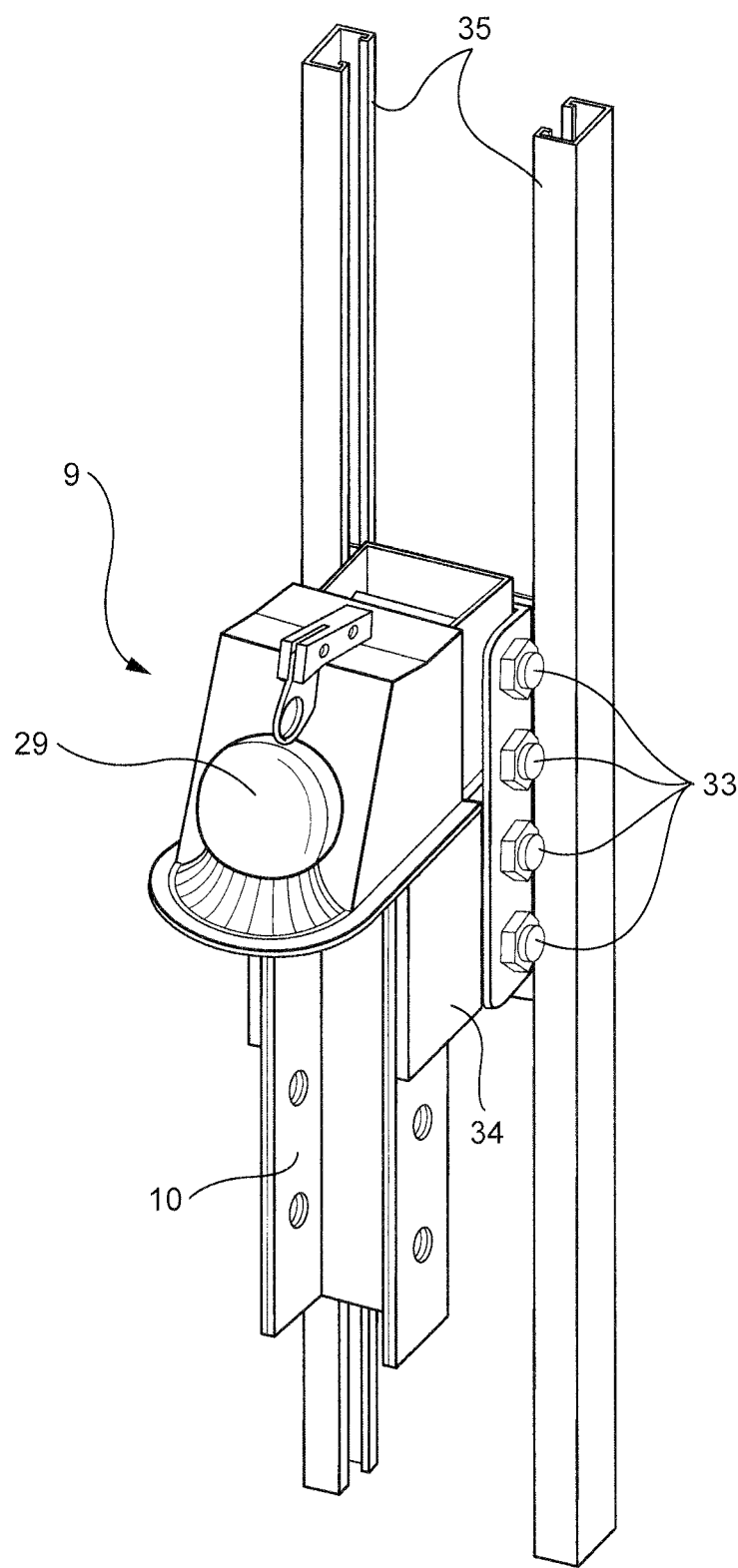
FIG. 10 schematically depicts the hitch assembly of FIG. 8 without the actuator.

Referring to FIGS. 1-7, the tailgating system 100 may be composed of a frame 48 constructed from square tube 49 formed of, for example, aluminum. Panels 50 formed of, for example aluminum, may be used to make the exterior surfaces of the tailgating system 100.

The tailgating system 100 may comprise a grill 1, a refrigerator 2, a countertop 3, a side table 4, pneumatic castor wheels 5 for mobility, a gas (e.g. propane) tank 6 to supply the grill, a dry storage space 7, and a utility cabinet 8 to store the tailgating system's components. The tailgating system may use a motorized hitch assembly 9 to lift and lower the tailgating system from a vehicle hitch, and a securing sleeve 10 to prevent movement during travel.

The grill 1 may be constructed from steel sheet metal. The grill 1 may be secured to the aluminum square tube frame 48 via sliding shelf rails 51. A gas tank mount 47 attached to the tailgating system allows gas tank 6 to be secured to the tailgating system. In the closed position, retainer tabs 13, formed for example of metal, prevent the grill hood 25 from opening. Only when the grill is pulled out can the grilling surface 24 be accessed when the grill hood 25 is lifted back. Additionally, the gas valve 23 can only be accessed when the grill is pulled out.

The draft beer system includes a draft tower 16 that remains flush with the countertop 3 when it is stored and not in use. When in use, the draft beer system dispenses beer from a pour spout 15 that is mounted to the draft tower 16. The pour spout 15 is supplied by a keg 20 that is stored in the tailgating system's refrigerator 2.

The refrigerated storage 18 is accessed by opening a right refrigerator door 21. The refrigerated storage 18 also holds an ice storage bin 19. The keg 20 is accessed by opening a left refrigerator door 22. The left refrigerator door 22 is opened by unlatching tabs 26 on the door 22. The right refrigerator door 21 is mounted to the left refrigerator door 22 and opens with it.

The refrigerator 2 for the keg 20 and the refrigerated storage 18 may be integrated into the cabinet that composes the tailgating system. The doors for the refrigerator 2, utility cabinet 8, control panel 11, and dry storage spaces 7 may be made of panels, formed for example of aluminum, similar to that used for the panels 50. Each of these doors may be connected to the tailgating system via, for example, hinges and locking latches. The doors may also include rubber gasket seals to ensure a watertight seal while doors are closed. The refrigerator doors 21, 22 may also be insulated.

The utility cabinet 8 may be integrated into the tailgating system. The square tube frame 48 and the exterior panels 50 may compose the shelves within the utility cabinet 8. Mounted to the shelves may be a 12 V battery, a battery charger, a power inverter, wiring, refrigeration equipment and additional power and control components. The utility cabinet may include a ventilator 12 to keep the components cool. The utility cabinet may also have a control panel 11 mounted to it. The control panel 11 may allow the user to manipulate the power and operations of the tailgating system.

The folding side table 4 may be made of square tube framing and panels similar to the frame 48 and panels 50. The side table 4 may be connected to the frame assembly via a hinge. A latching mechanism may secure the table 4 during travel. A propping mechanism 17 may be used to hold the table 4 up during use.

Referring to FIGS. 8-12, a linear actuator 27 may be driven by an electric motor 28 and used to activate the motorized hitch assembly 9. The power for the electric motor 28 may be supplied by an onboard battery. The linear actuator 27 may drive a standard hitch coupling 29 up and down in order to raise and lower the tailgating system from the ground when attached to a vertical ball hitch assembly 14 via the securing sleeve 10. The motorized hitch assembly 9 is secured to the tailgating system at two points, a linear actuator securing top point 30 and a linear actuator securing bottom point 31. A guide block 32 connects the linear actuator 27 to the hitch coupling 29 via bolts 33 and hitch extension 34 for clearance from the tailgating system, and the guide block 32 is also connected to track wheels 36 that guide the motorized hitch assembly 9 up or down. Two tracks 35 on either side of the motorized hitch assembly 9 are also attached to the tailgating system and guide the hitch assembly 9 via the track wheels 36 in a vertical direction.

The vertical ball hitch assembly 14 may be made of, for example, 2×2 inch square steel tube 42 and may fit in, for example, a standard Class 3 trailer receiver hitch 37. A standard hitch ball coupling 38 may be used. The vertical ball hitch assembly 14 may have a vertical securing post 39 with two positions 40, 41. The first position 40 may place the standard hitch ball coupling 38 at an elevation equal to the receiver hitch 37. The second position 41 may place the standard hitch ball coupling 38 at an elevation approximately 10 inches higher than the receiver hitch 37. These two positions 40, 41 may accommodate vehicles of varying height.

Figure 14:
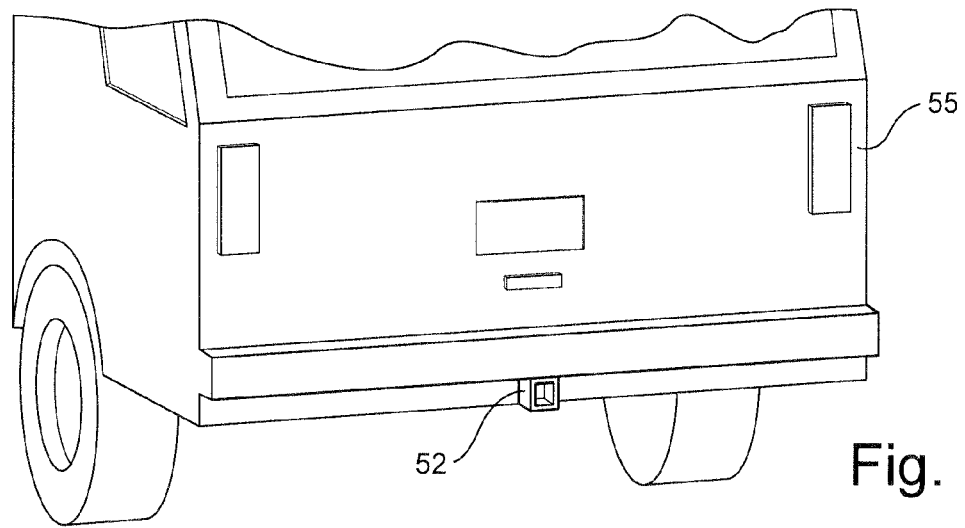
FIG. 14 schematically depicts a vehicle usable with the tailgating system.

The tailgating system is joined to the vehicle by the vertical ball hitch assembly 14 and the vehicle supports the load of the tailgating system in a cantilevered fashion with the 2×2 inch square steel tube 42. A pin 43 is placed through the vehicle hitch 52 (FIG. 14) and the receiver hitch 37 to secure the two together during travel. The motorized hitch assembly 9 of the tailgating system is secured to the securing post 39 of the hitch assembly 14 with a double pin connector 44 that inserts through the holes 45 of the securing sleeve 10 and holes 46 of the securing post 39 of the hitch assembly 14.

The tailgating system may be a packaged unit where the outer shell is made of metal panels, or cladding. The tailgating system includes the grill 1, the refrigerator 2, the draft beer system, a refrigerated location to hold the keg 20, electrical connections for both appliances that use AC and DC power. The tailgating system also includes castor wheels 5 for mobility. The tailgating system has countertop surfaces 3 that are made up of the top of the tailgating system, the draft beer tower 16 when it is in a closed position, and the side table 4 that can be stored and locked for travel or propped up to a horizontal position for use. The tailgating system may be configured in a way such that all interior spaces can be locked shut and all attachments (e.g., the grill 1 and the draft tower 16) can be locked to prevent manipulation and to deter vandalism and theft. The tailgating system may also be configured to allow for use outdoors and includes seals on all openings to its interior to prevent the introduction of water or any other foreign materials.

The castor wheels 5 may be connected to the bottom of the tailgating system at the four corners of the cabinet apparatus. It should be appreciated that additional castor wheels may be provided.

The tailgating system may also be configured to be attached to a vehicle receiver hitch 52 where the tailgating system connects to the female connection point of the vehicle receiver hitch 52 that is in the shape of a hollow square tube. The square tube 42 of the tailgating assembly's hitch assembly 14 is configured to fit into this connection point of the vehicle receiver hitch 52. The connection between the tailgating system 100 and the receiver hitch 52 may be secured with the pin 43. When the square tube 42 of the tailgating system is inserted into the female connection of the receiver hitch 52 holes drilled on either side of each of the square tubes align allowing for the connection pin 43 to be inserted through the holes. The pin 43 prevents the square tube 42 of the tailgating system from being removed from the receiver hitch 52.

Figure 15:
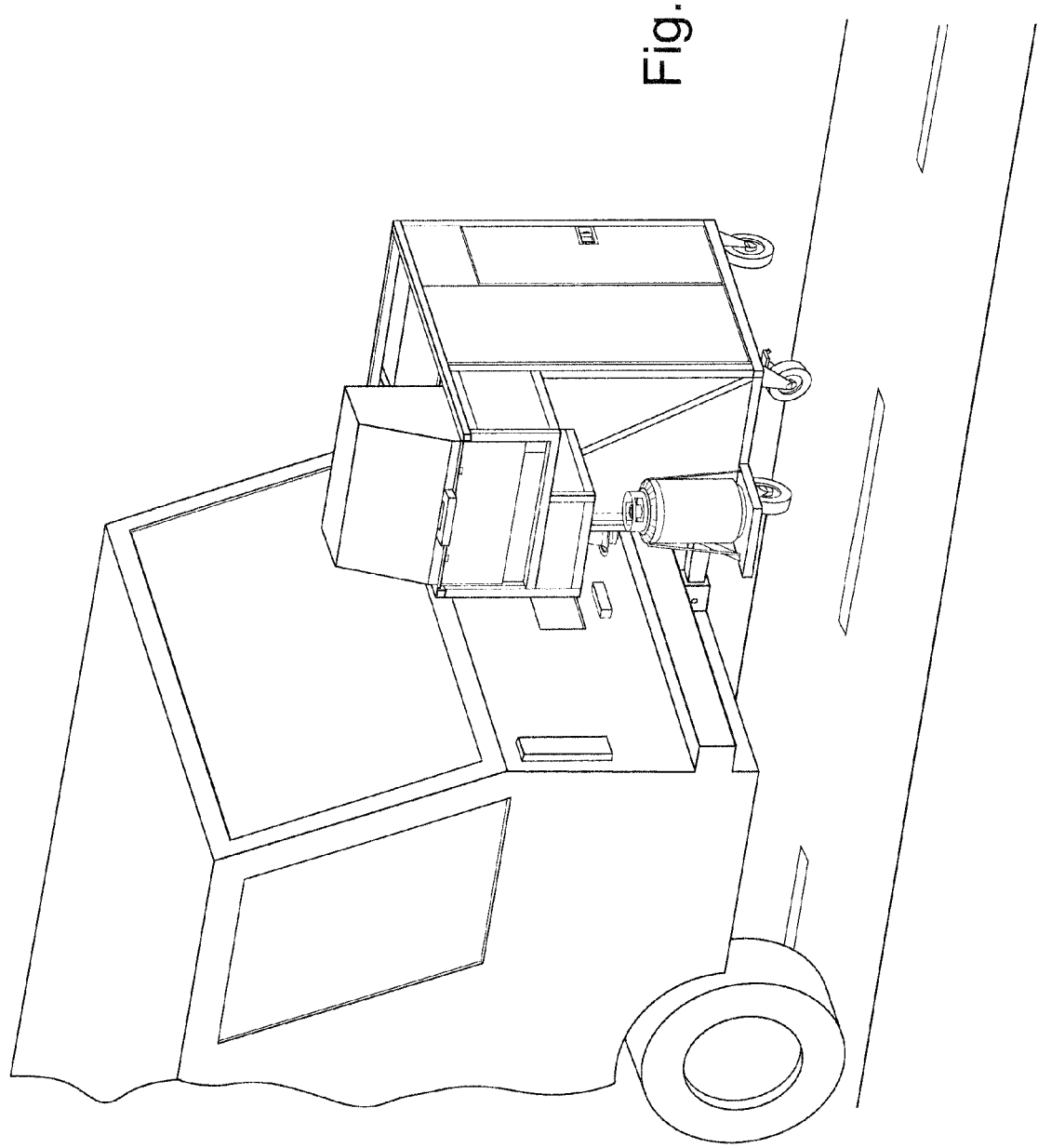
FIG. 15 schematically depicts the tailgating system secured to the vehicle of FIG. 14 and raised for transport with the vehicle.
Figure 16:
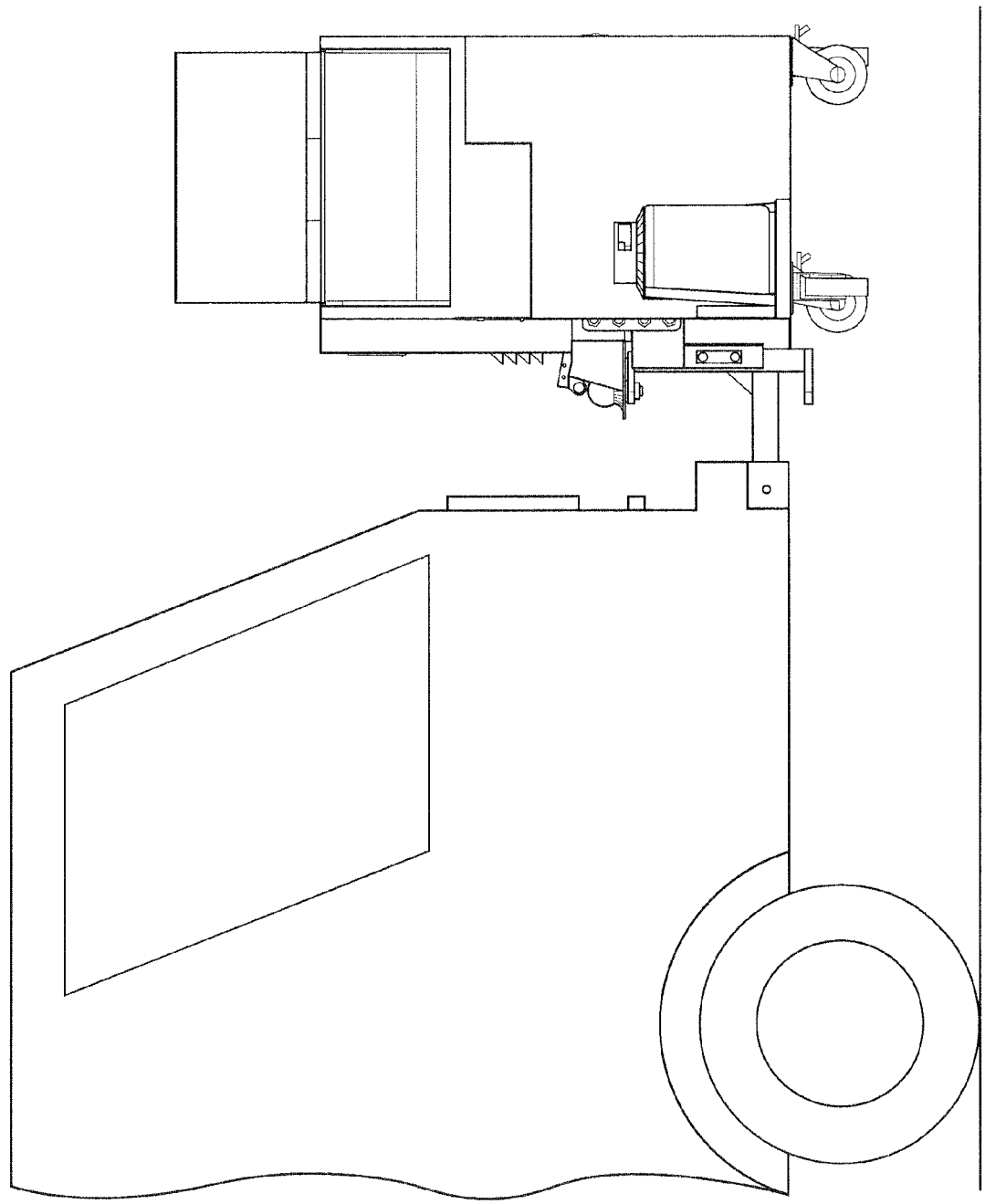
FIG. 16 schematically depicts a side view of the tailgating system secured to the vehicle and raised for transport with the vehicle.

The tailgating system may be configured so that its overall weight does not exceed that of the tongue weight rating of the vehicle receiver hitch 52. The tailgating system is configured to be transported where it is lifted off of the ground and the entire weight of the tailgating system is supported by the vehicle receiver hitch 52. The tailgating system's weight may be supported in the vertical direction by the vehicle receiver hitch. This vertical force or weight is also known as the tongue weight. While the vehicle is traveling (FIGS. 15 and 16), the tailgating system does not make contact with the ground.

Figure 11:
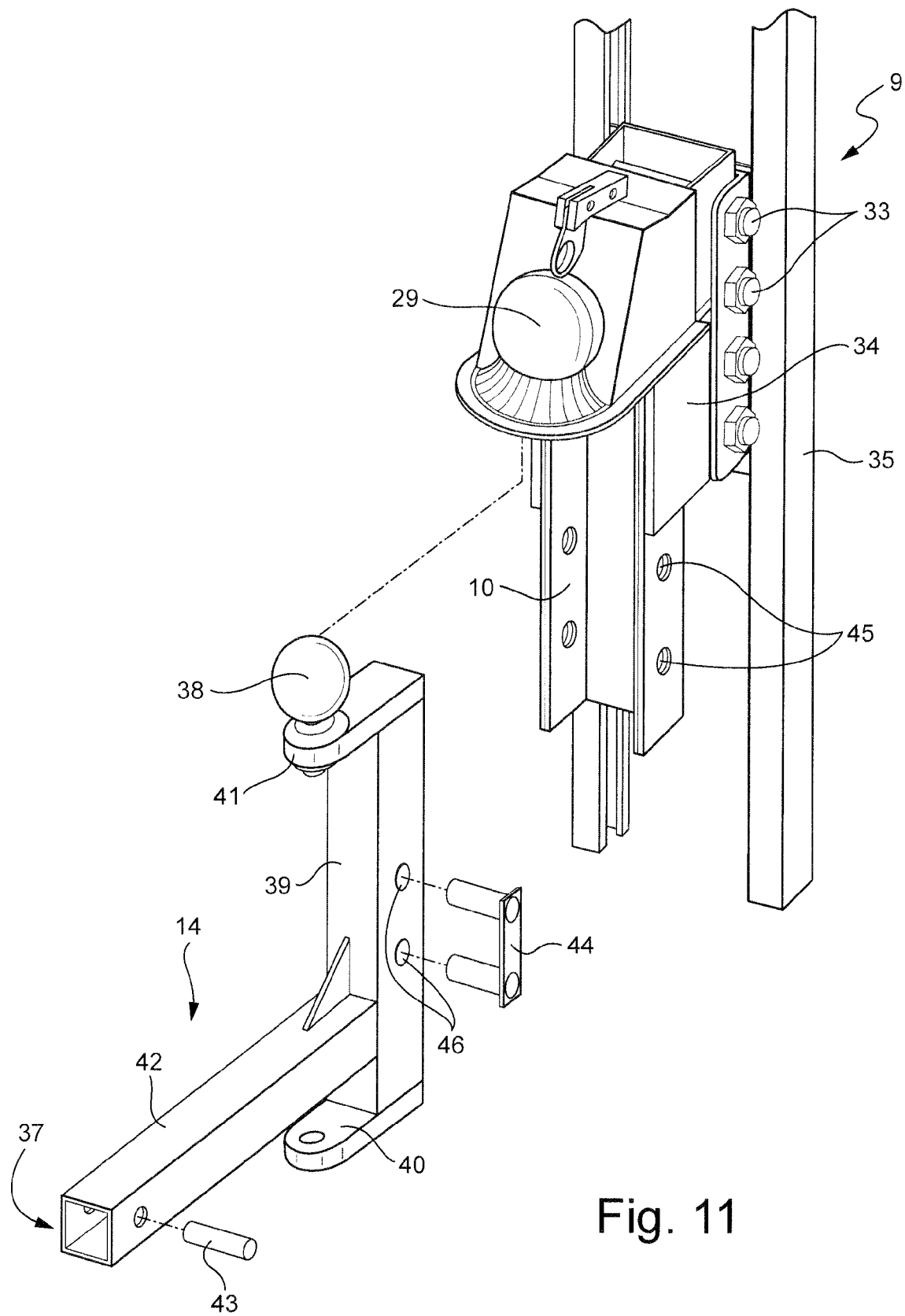
FIG. 11 schematically depicts securing the hitch assembly of FIGS. 8-10 to a ball hitch assembly of a vehicle with a hitch ball and a securing post.
Figure 12:
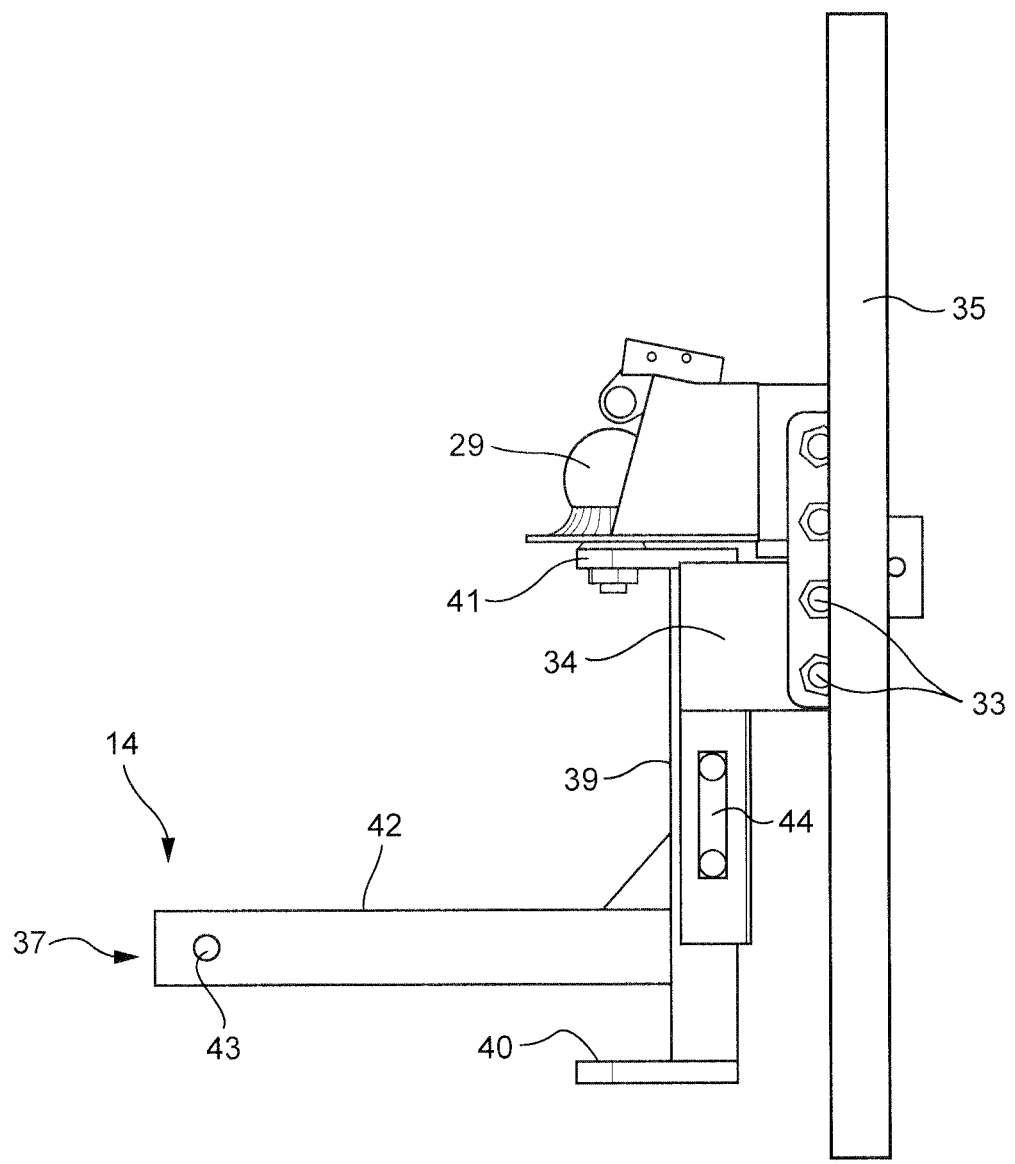
FIG. 12 schematically depicts a side view of the hitch assembly (without actuator) connected to the ball hitch assembly with securing post.
Figure 13:
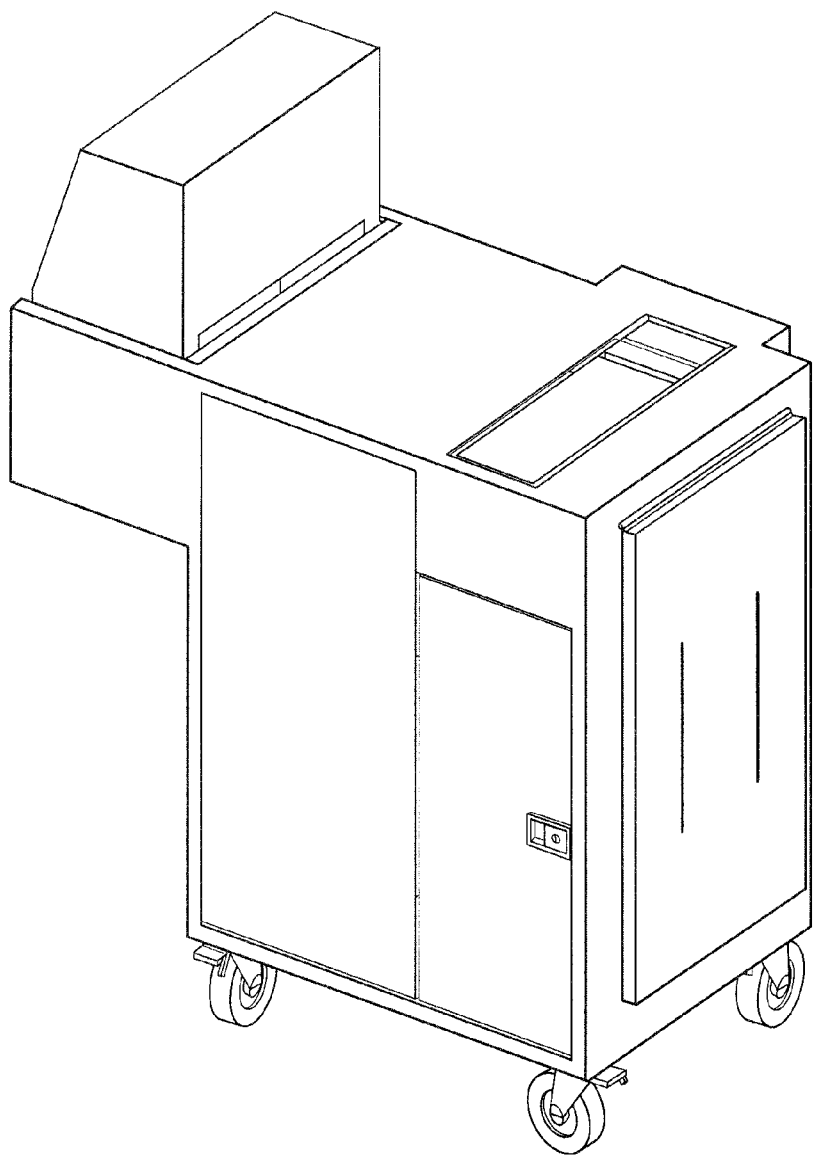
FIG. 13 schematically depicts a perspective view of the tailgating system of FIG. 1.
Figure 17:
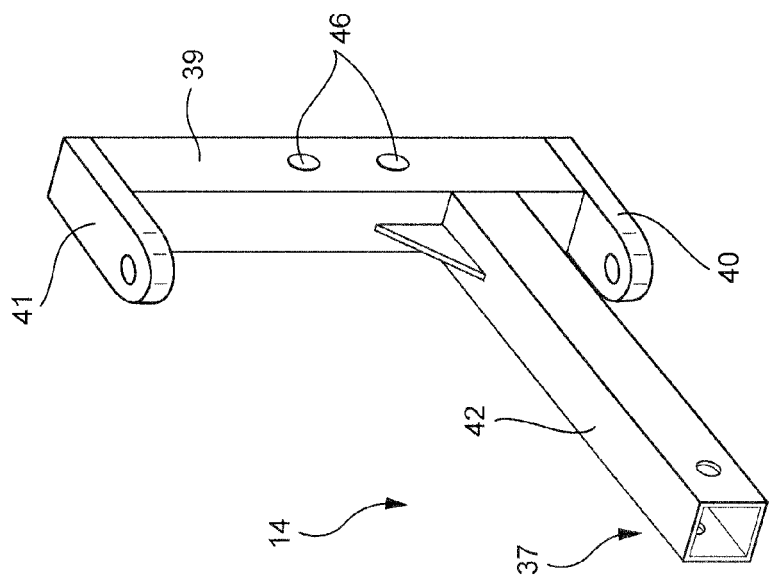
FIG. 17 schematically depicts a ball hitch assembly with securing post (without hitch ball shown) usable with the tailgating system.

Referring to FIG. 17, the square tube 42 of the tailgating system, described previously, that is configured to insert into the receiver hitch 52 of a vehicle 55 (FIG. 14) is a part of the vertical ball hitch assembly 14. This component of the tailgating system is configured from a horizontal square tube 42 (the same tube that inserts into the aforementioned vehicle receiver hitch), a vertical square tube (i.e. the securing post 39), a standard hitch ball 38, and mounting plates (i.e. the first and second positions 40, 41) for securing the hitch ball 38 (FIG. 11). The vertical square tube 39 is connected at the end of the horizontal square tube 42 at a right angle, opposite the end that connects to the vehicle receiver hitch 52. The vertical square tube 39 is offset so that one portion extends beyond the point of connection at a distance longer than the portion extending on the opposite side of the horizontal square tube 42. At each end of the vertical square tube 39 a mounting plate 40, 41 is attached. Each mounting plate 40, 41 includes a hole so that the hitch ball 38 can be secured.

Figure 18:
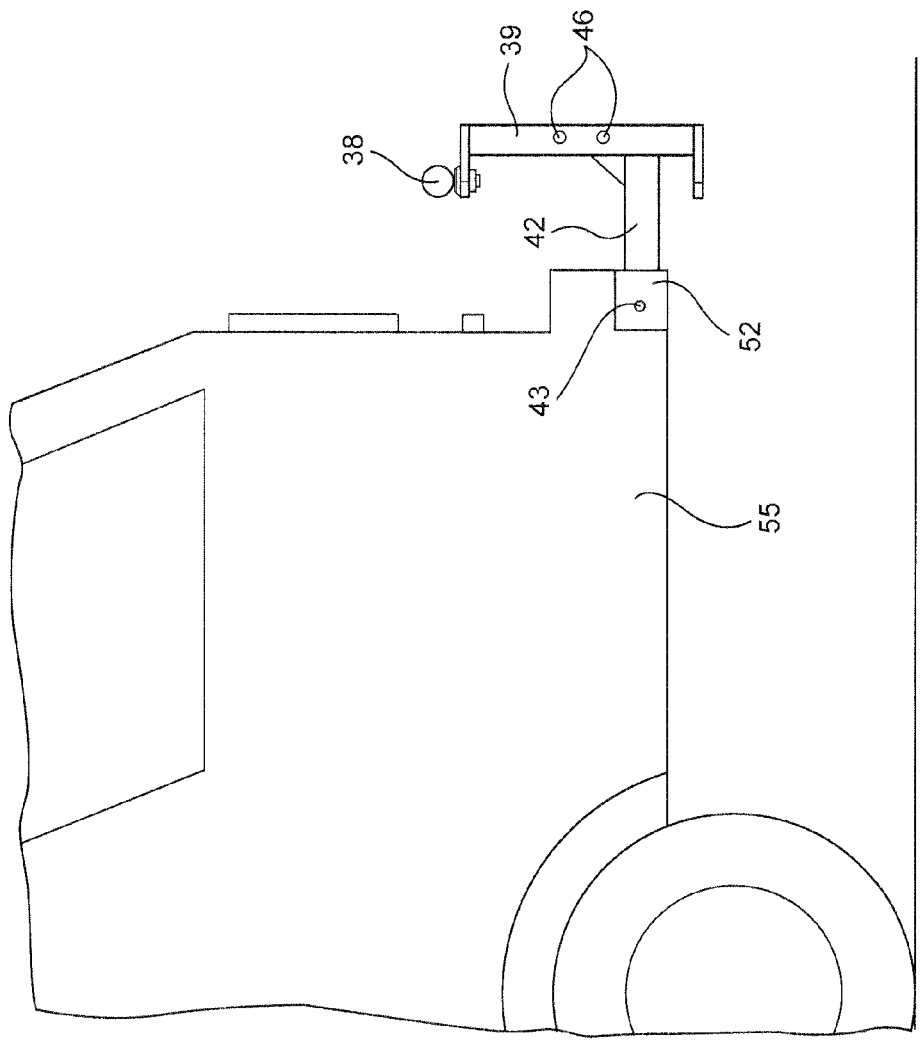
FIG. 18 schematically depicts the ball hitch assembly with securing post and hitch ball assembled to the vehicle.

A user inserts the vertical ball hitch assembly 14 by inserting the end of the horizontal square tube 42 into the vehicle receiver hitch 52 and securing it with the pin 43 (FIG. 18). The vertical ball hitch assembly 14 is inserted so that the securing post 39 is positioned vertically. The hitch ball 38 is secured to the mounting plate 40 or 41 that is on the top side of the securing post 39. The securing post 39 is offset relative to the horizontal tube 42 and this places the hitch ball 38 at one elevation. The elevation of the hitch ball 38 can be changed if it is desired by a user. Before inserting into the vehicle receiver hitch 52, the user can rotate the vertical ball hitch assembly 14 with the securing post 39 by 180° so that the other mounting plate 41 or 40 is now on the top side. The hitch ball 38 can now be secured to this mounting plate.

The securing post 39 is also configured with two holes 46 the length of the securing post's width that are perpendicular to both the securing post 39 and the horizontal square tube 42. These holes 46 are used to secure the tailgating system to the vertical ball hitch assembly 14, and ultimately the vehicle 55 used for travel.

Figure 19:
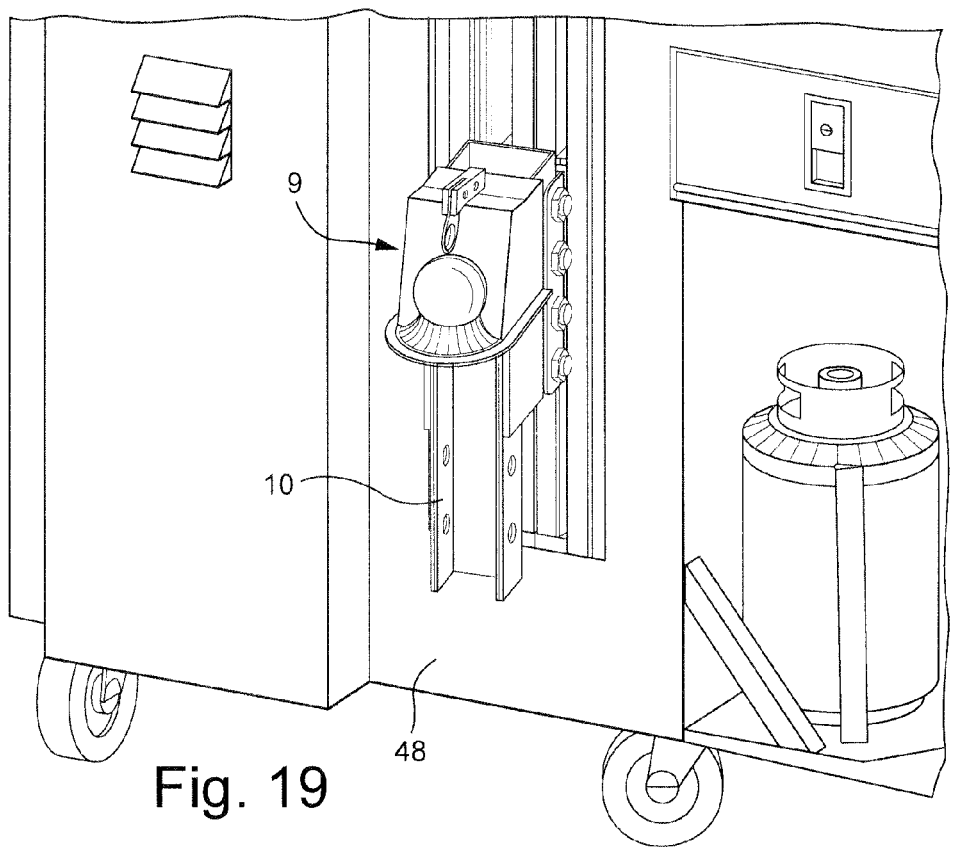
FIG. 19 schematically depicts the hitch assembly of the tailgating system.
Figure 20:
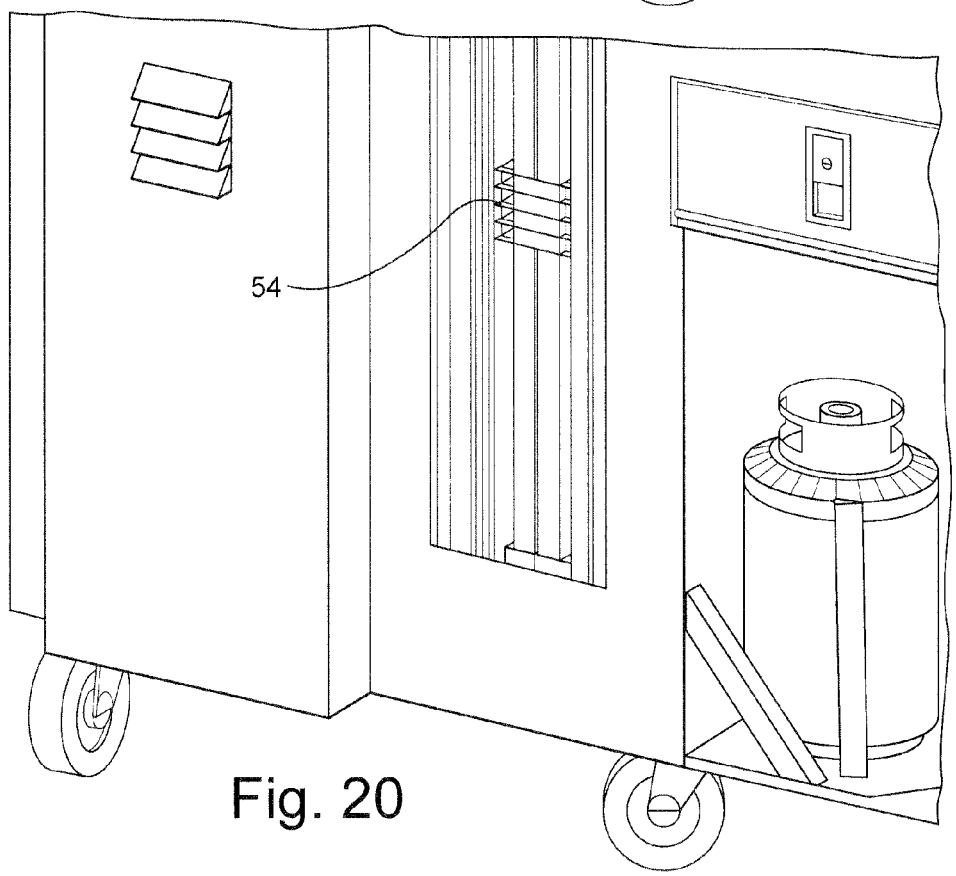
FIG. 20 schematically depicts the actuator of the hitch assembly.

The tailgating system is secured to the vertical ball hitch assembly 14 by the motorized hitch assembly 9. The motorized hitch assembly 9 is comprised of the linear actuator 27, the ball hitch coupling 29, the securing sleeve 10, the track wheels 36, the track guides 35, and the guide block 32. The linear actuator 27 may comprise a post 53 (FIG. 9) that is mounted to the frame 48 of the tailgating system (FIG. 19). A collar 54 (FIGS. 9 and 20) on the linear actuator's post 53 is driven by the motor 28 within the linear actuator 27 and moves up and down on the post 53. The collar 54 is connected to the guide block 32 which may be, for example, a square metal piece. Attached on either side of the guide block 32 are the track wheels 36. The track wheels 36 are configured to be placed inside the track guides 35.

Figure 21:
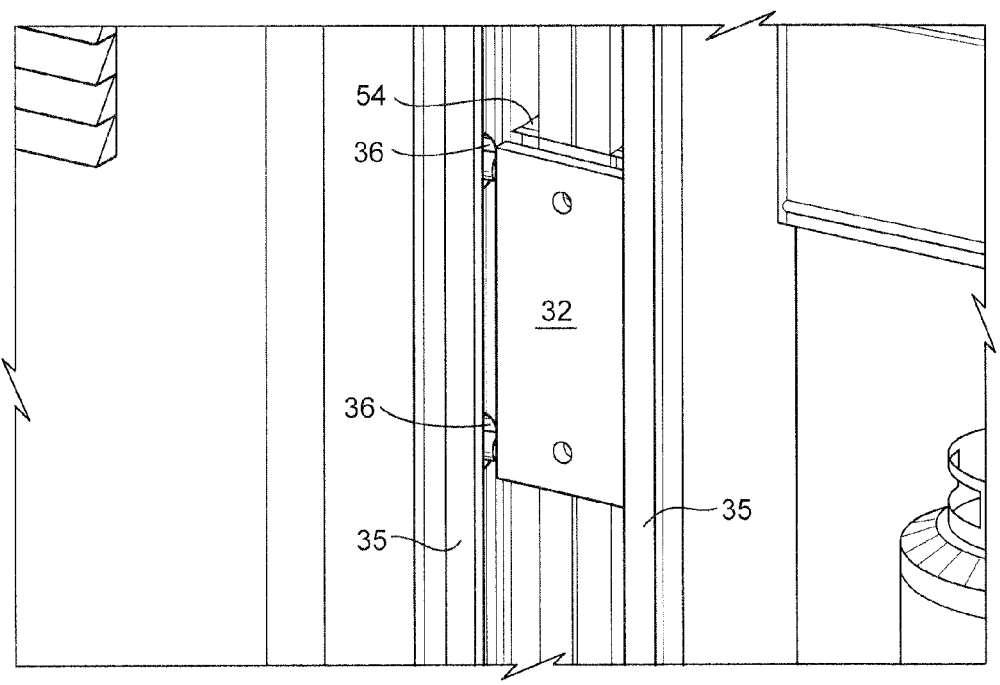
FIG. 21 schematically depicts the actuator of the hitch assembly and connected guide block.

The track guides 35 are placed on either side of the guide block 32 and they are mounted to the tailgating system. The track guides 35 are positioned vertically so that the track wheels 36, which are confined to the interior space of the track guides 35, can only move in the vertical direction. As the linear actuator's motor 28 acts on the collar 54 to move it up and down, the guide block 32, and track wheels 36 move with the collar 54 (FIG. 21). The track guides 35 are configured to carry the horizontal loads that may be present while the linear actuator 27 is configured to carry the vertical loads that may be present. Attached to the guide block 32 is the ball hitch coupling 29. The ball hitch coupling 29 also moves up and down as the guide block moves. The ball hitch coupling 29 is configured to receive the hitch ball 38 that is mounted on the vertical ball hitch assembly 14. The hitch ball coupling 29 also extends out of the tailgating system to allow clearance for the vertical securing post 39 of the vertical ball hitch assembly 14. Also connected to the guide block 32 is the securing sleeve 10. The securing sleeve 10 is located below the hitch ball coupling 29 and is comprised of, for example, metal plates. The securing sleeve 10 is configured similar to a square tube. However, a fourth side is not present. The securing sleeve 10 is configured to align with the vertical securing post 39 of the vertical ball hitch assembly 14 and make contact with three of its four sides.

The securing sleeve 10 also may comprise two holes 45 the length of the securing sleeve's width that are positioned horizontally. The holes 45 are used to secure the tailgating system to the vertical ball hitch assembly 14, and to the vehicle 55.

The securing sleeve 10 is configured to prevent movement of the tailgating system while it is mounted to the vertical ball hitch assembly 14, and to the vehicle 55.

Figure 22:
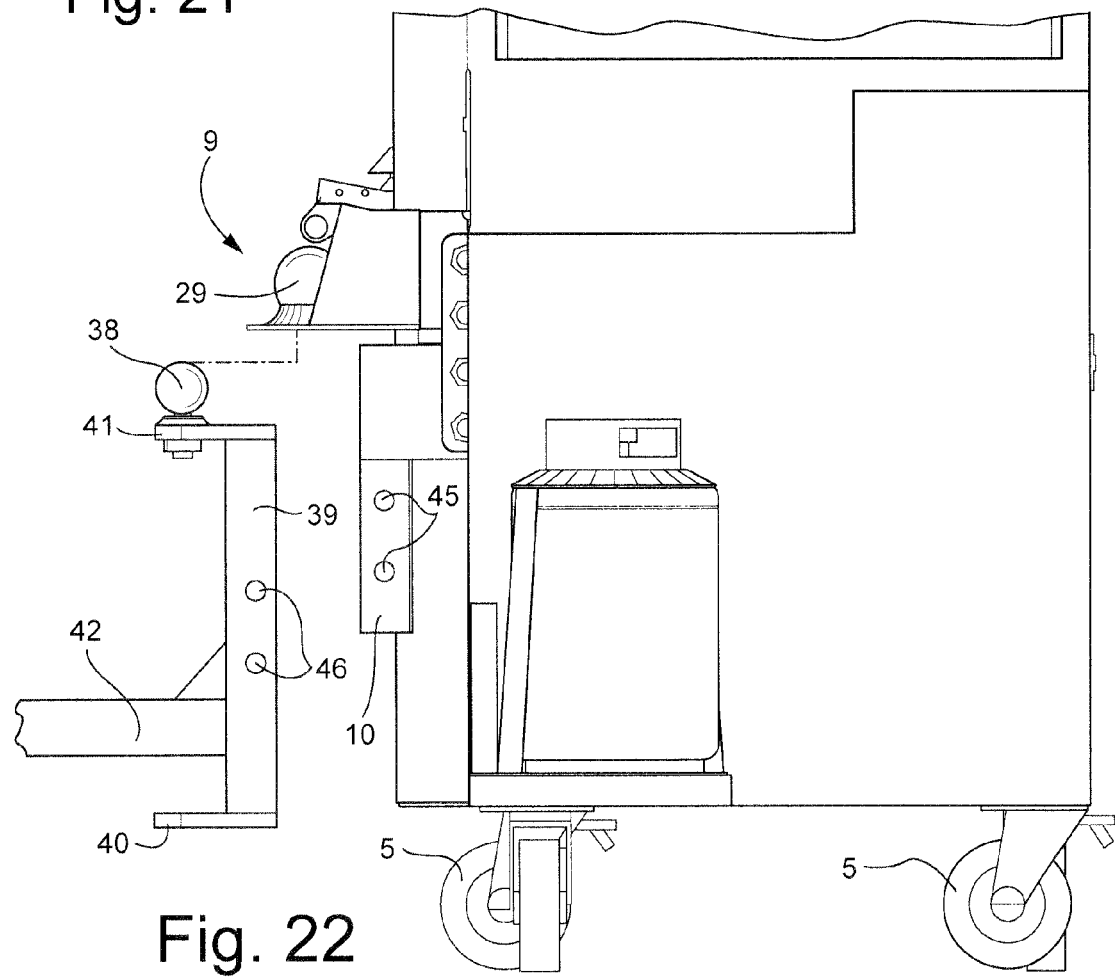
FIG. 22 schematically depicts the tailgating system prior to securement to the ball hitch assembly.

After the vertical ball hitch assembly 14 is secured to the vehicle 55, the tailgating system is secured to the vertical ball hitch assembly 14 in the following manner. The motor 28 of the linear actuator 27 acts on the motorized hitch assembly 9 to raise the motorized hitch assembly 9 to an elevation slightly above the hitch ball 38 of the vertical securing post 39 of the ball hitch assembly 14 (FIG. 22).

Figure 23:
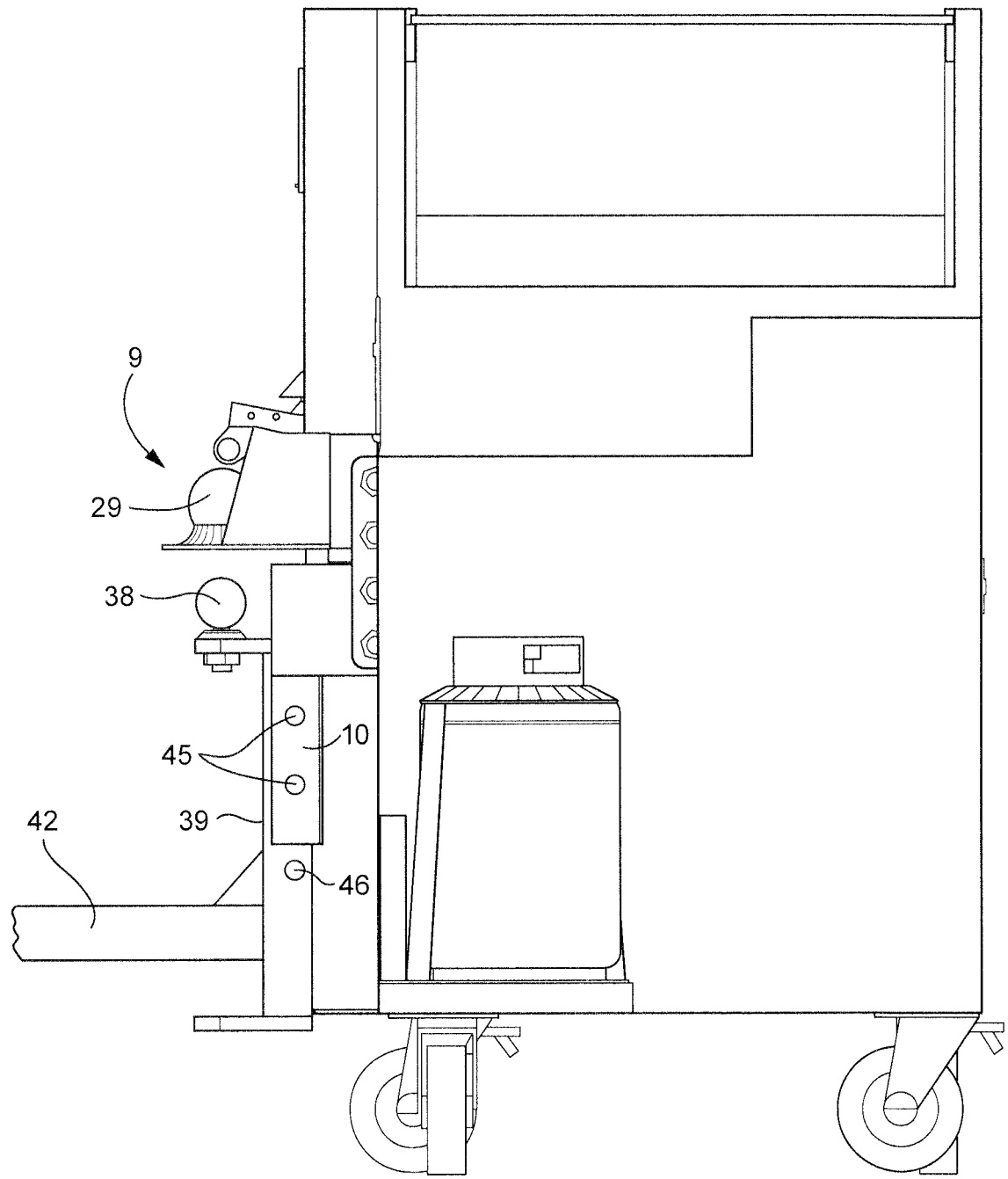
FIG. 23 schematically depicts aligning the hitch assembly of the tailgating system over the ball hitch assembly.

The tailgating system, which is mounted on castor wheels 5, is positioned so that the three interior sides of the securing sleeve 10 of the motorized hitch assembly 9 contact three sides of the vertical securing post 39 of the vertical ball hitch assembly 14. This alignment positions the ball hitch coupling 29 directly over the hitch ball 38 (FIG. 23).

Figure 25:
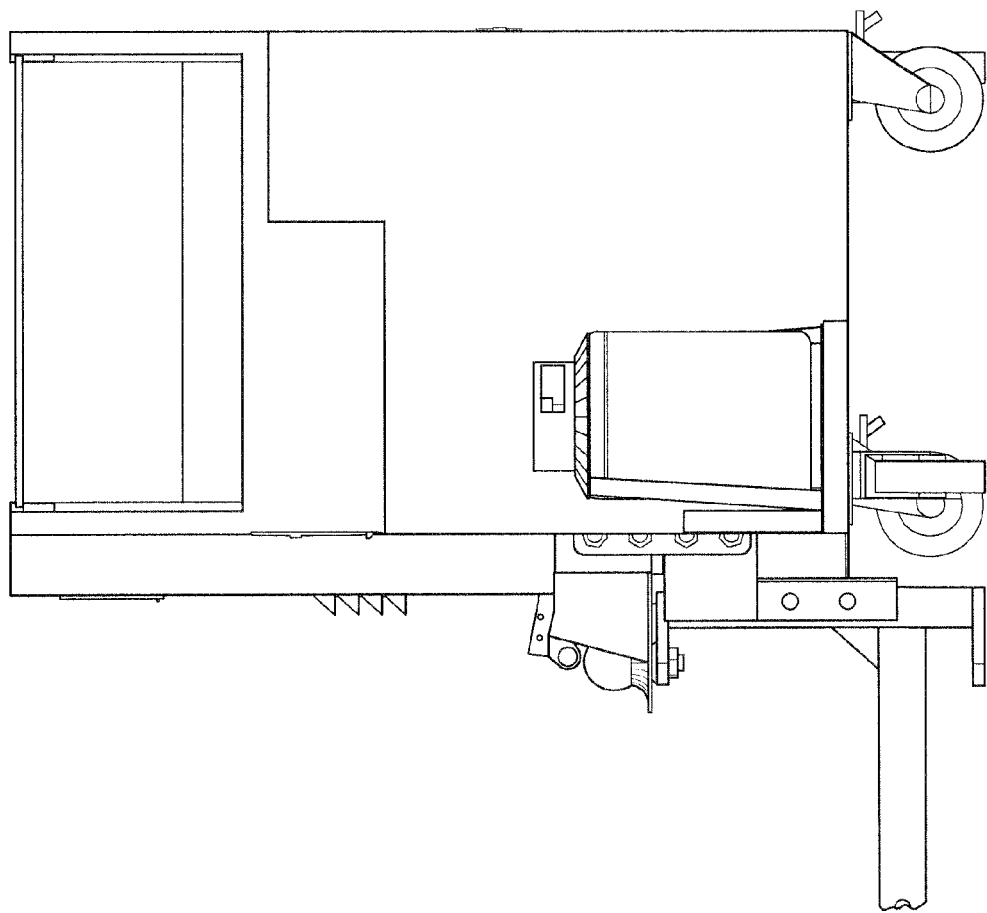
FIG. 25 schematically depicts the hitch assembly raising the tailgating system.
Figure 24:
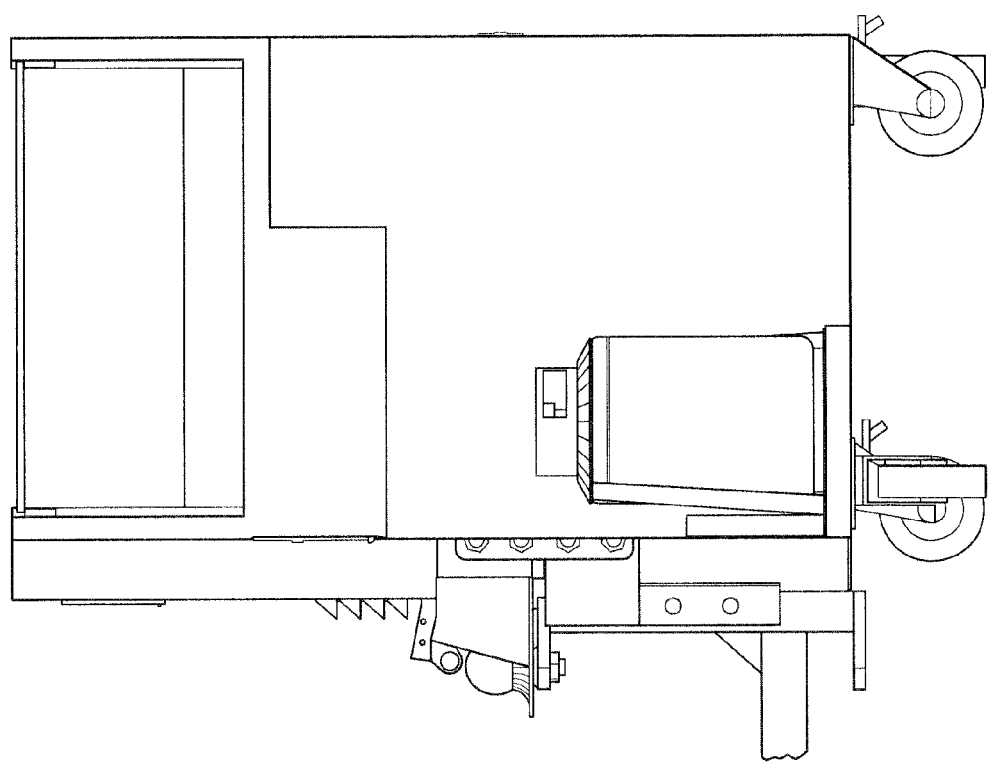
FIG. 24 schematically depicts coupling the hitch assembly of the tailgating system to the ball hitch assembly of the vehicle.

The motor 28 then acts on the motorized hitch assembly 9 to lower the motorized hitch assembly 9 so that the hitch ball 38 couples with the ball hitch coupling 29 (FIG. 24). The motor 28 continues to move the motorized hitch assembly 9 in the downward direction while the motorized hitch assembly 9 is connected to the vertical ball hitch assembly 14 (FIG. 25). The vertical ball hitch assembly 14 is secured to the vehicle 55 and the connection to the vehicle 55 is configured to prevent the vertical ball hitch assembly 14 from moving.

The resulting downward force of the motorized hitch assembly 9 causes the tailgating system to lift off of the ground. The securing sleeve 10 of the motorized hitch assembly 9 limits the movement of the tailgating system to vertical directions only, relative to the vertical ball hitch assembly 14. The weight of the tailgating system is supported on one side, off the center of gravity of the tailgating system. This creates a moment relative to the hitch ball 38. This moment is countered by the vertical securing post 39 of the vertical ball hitch assembly 14 which acts against the securing sleeve 10.

Figure 26:
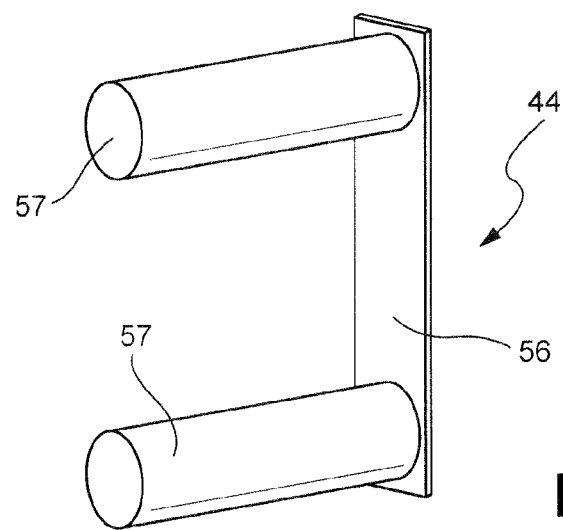
FIG. 26 schematically depicts the double pin connector.

When the hitch ball couples 38 with the ball hitch coupling 29 the holes 46 of the vertical securing post 39 of the vertical ball hitch assembly 14 align with the holes 45 of the securing sleeve 10. The double pin connector 44 is used to secure the connection of the vertical ball hitch assembly 14 and the tailgating system. The double pin connector 44 is configured with two parallel pins 57 that are joined by a plate 56 (FIG. 26). The plate keeps the two pins parallel to each other. The double pin connector 44 inserts into the aligned holes 46 of the vertical securing post 39 of the vertical ball hitch assembly 14 and the holes 45 of the securing sleeve 10 and is configured to prevent the hitch ball 38 from becoming uncoupled from the ball hitch coupling 29.

Figure 27:
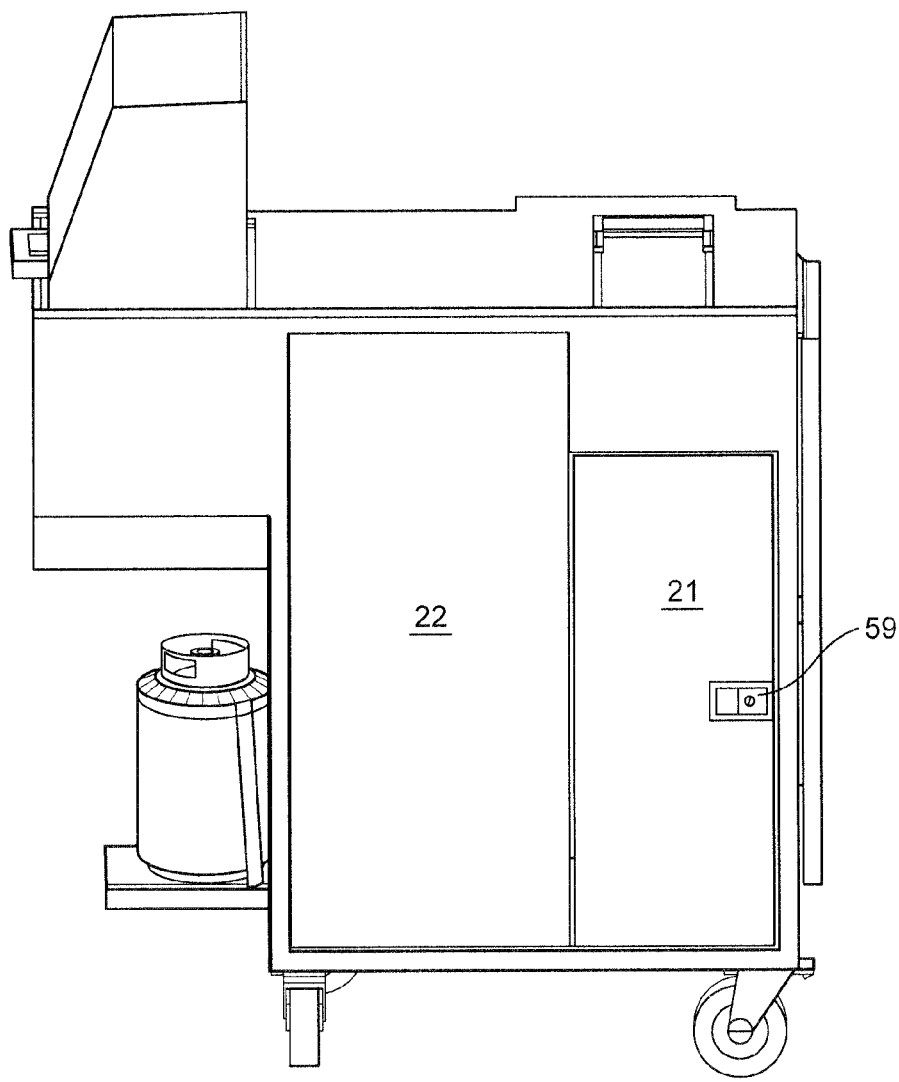
FIG. 27 schematically depicts the two doors, left and right, of the refrigerated space of the tailgating system.

The tailgating system is configured with a refrigerator 2 integrated into the frame 48. The refrigerated storage space 18 is configured to include spaces for both storage of goods, including for example canned beverages, the keg 20, a carbon dioxide tank 58 (FIG. 32) for use with the keg 20, and an air flow circulation fan. The refrigerator 2 may comprise two doors 21, 22. The exterior surfaces of the doors are configured to be comprised of materials similar to those used for the exterior surface of the tailgating system, e.g. aluminum panels. The doors 21, 22 are also configured with a locking mechanism 59 (FIG. 27) to allow or prevent access to the refrigerated space 18. The interior side of the refrigerator doors 21, 22 may be comprised of materials similar to that used for the interior surfaces of the refrigerator storage space, and a gap may separate the interior and exterior surfaces and insulation may be placed in the gap. A gasket, or seal, 60 (FIG. 28) may line the perimeter of the interior surface of each door and be configured to prevent the transfer of air or water between the outside and inside of the of the refrigerated space 18 when the doors 21, 22 are in the closed position.

The refrigerator doors 21, 22 are configured to cover and seal the interior of the refrigerator 2 by covering one side of the refrigerator where a wall is not present. On this side of the refrigerator, the height of the refrigerator may not be constant across the entire width of the refrigerator and the height can comprise two different heights. The right refrigerator door 21 may be configured to define the height on the right side of the refrigerated space 18, and the left door 22 may define the height on the left side. Therefore, the two refrigerator doors 21, 22 may not be the same height.

Figure 30:
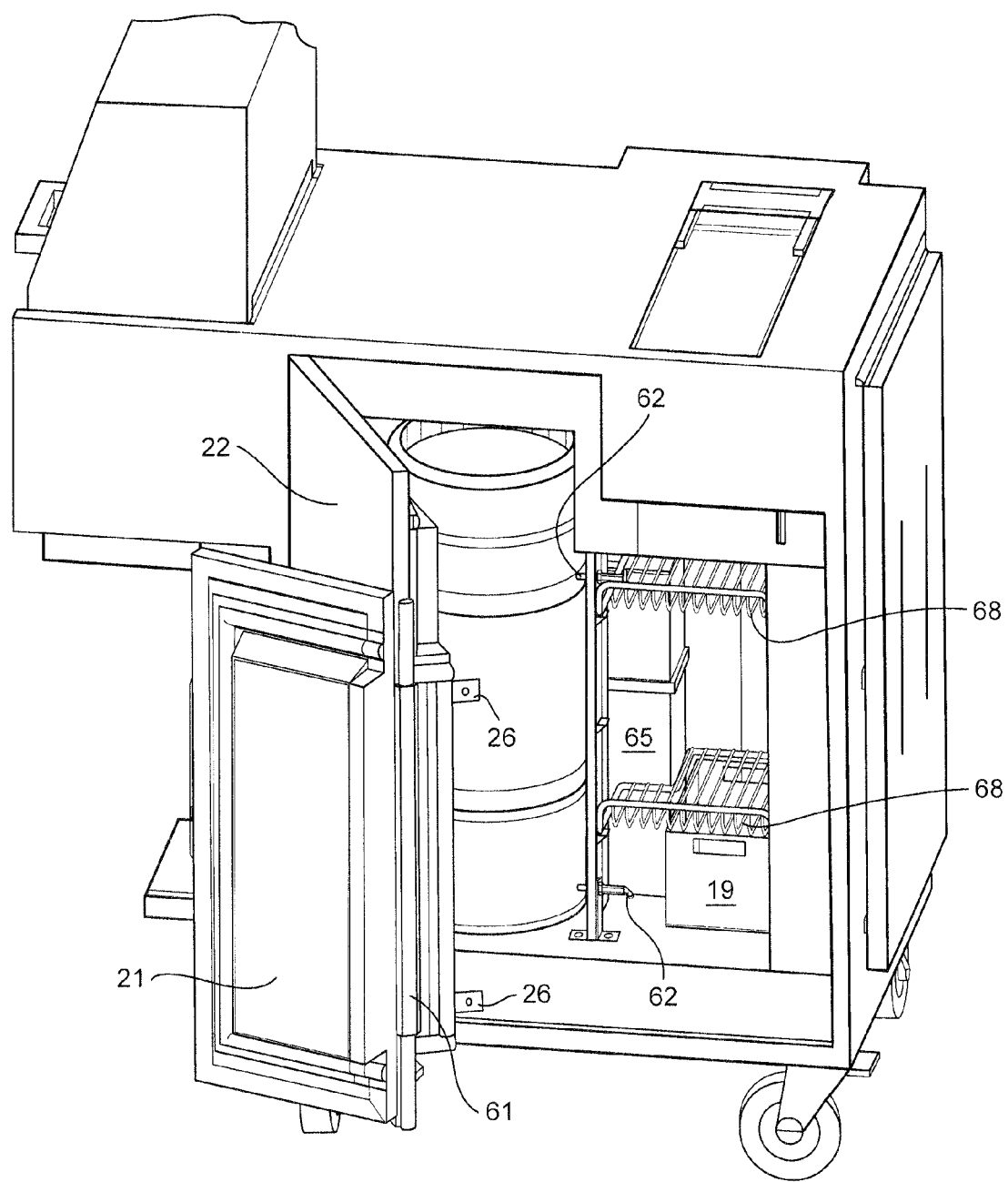
FIG. 30 schematically depicts the tailgating system with the left door open and the right door attached to the left door.

The right refrigerator door 21 may include the locking mechanism 59. In order to access the refrigerated space 18, the locking mechanism 59 is unlocked to allow the right door 21 to be opened (FIGS. 28 and 29). The right refrigerator door 21 may be connected to the left refrigerator door 22 with a hinge 61 (FIG. 30). The hinge 61 is on the side of the right door 21 opposite the locking mechanism 59. The right refrigerator door 21 can rotate around the hinge 61 and away from the refrigerator so that the right side of the interior of the refrigerated space 18 can be accessed. When the right refrigerator door 21 and the locking mechanism 59 are acted on, the left refrigerator door 22 remains in a secured position where the left door 22 cannot be moved from its closed position.

Figure 31:
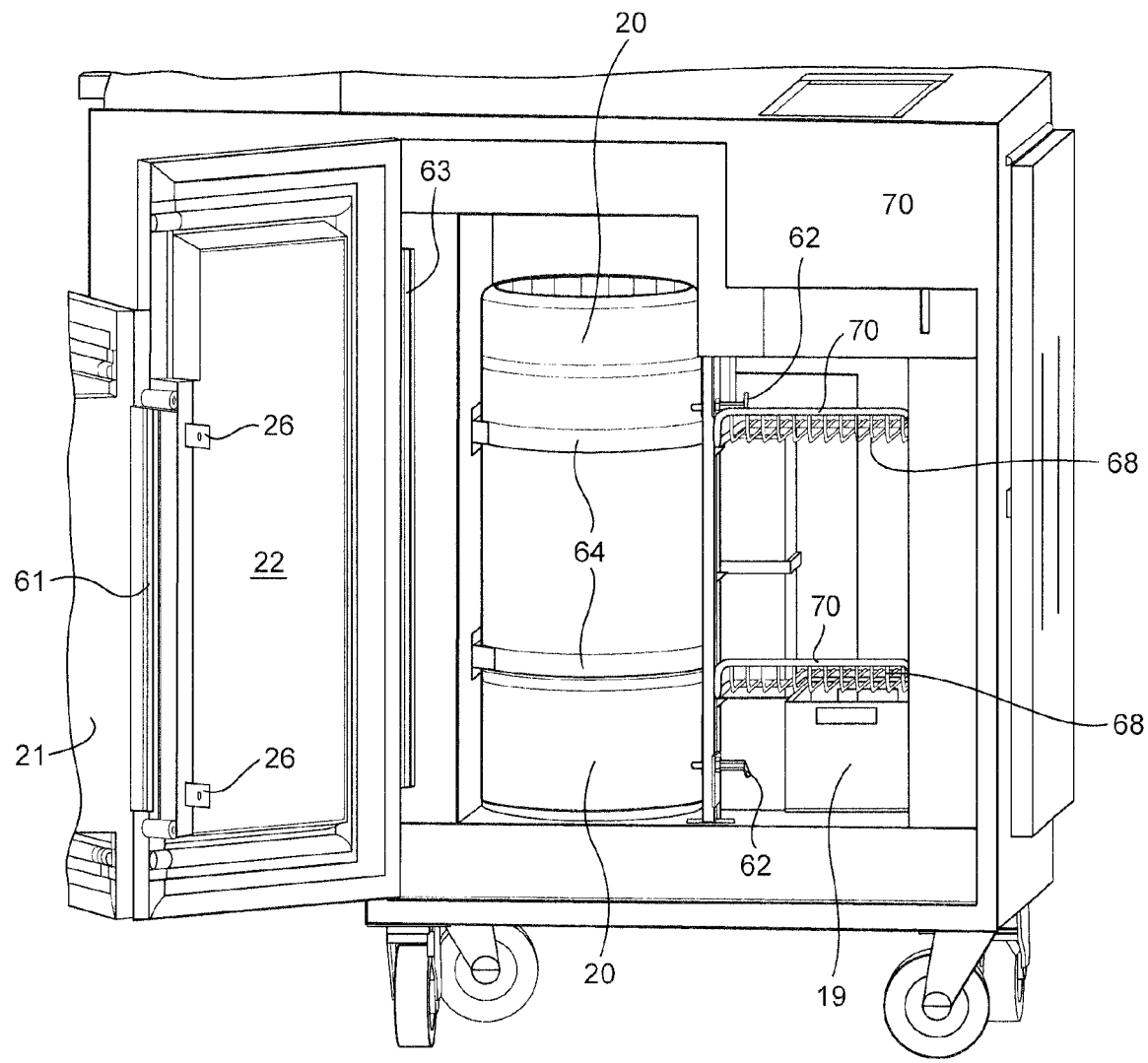
FIG. 31 schematically depicts an interior of the refrigerated space.

The left refrigerator door 22 may be secured in the closed position by two latching tabs 26 (FIG. 30). The latching tabs 26 may be connected to the interior surface of the left refrigerator door 22 and may be positioned at the top and bottom corners of the left refrigerator door 22 on the same side as where the hinge 61 is located that connects the right and left refrigerator doors 21, 22. The latching tabs 26 may be configured to extend out from the surface of the interior surface of the left refrigerator door 22. The interior of the refrigerator may also include latching pins 62 (FIGS. 30-34) that are configured to engage the latch tabs 26 to secure the left refrigerator door 22. For example, the latching pins 62 may extend through holes formed in the latch tabs 26. The latching pins 62 may be secured to the surface of the refrigerator interior 18. The latching pins 62 are a locking mechanism. The latching pins 62 may interlock with the latching tabs 26 to prevent the left refrigerator door 22 from moving. Because the latching pins 62 may be located in the interior of the refrigerator, they can only be acted on after the right refrigerator door 21 has been opened. After the right refrigerator door 21 is open, the two latching pins 62 that interlock with the latching tabs 26 can be acted on to disconnect the latching pins 62 from the latch tabs 26. This action may release the left refrigerator door 22 from the closed position. The left refrigerator door 22 may be connected to the frame of the tailgating system by a hinge 63 (FIG. 31), similar to the hinge 61 that may be used to connect the right refrigerator door 21 to the left refrigerator door 22. The hinge 63 on the side of the left refrigerator door 22 is opposite the latching tabs 26. The left refrigerator door 22 can rotate around the hinge 63 and away from the refrigerator so that the left side of the interior of the refrigerated space 18 can be accessed. The right refrigerator door 21 can remain connected to the left refrigerator door 22 by the hinge 61 and may move whenever the left refrigerator door 22 moves. By opening the left refrigerator door 22, both the right and left sides of the interior of the refrigerated space 18 can be accessed at the same time.

The interior 18 of the refrigerator 2 includes a space for the keg 20. The tailgating system may comprise straps 64 (FIG. 31) that may connect to the interior wall of the refrigerator. The straps 64 can secure the keg 20 and prevent it from moving relative to the refrigerator 2.

The interior of the refrigerator also includes a space for the carbon dioxide tank 58 (FIG. 32) for use with a draft beer system. The tank 58 can be configured to be placed in a sleeve 65 (FIG. 32) where the tank 58 would be secured in an upright position. One side of the sleeve 65 may be open and a strap prevents the tank 58 from moving outside of the sleeve 65. The open side of the sleeve 65 allows the tank 58 to be inserted and removed from the interior of the sleeve 65. The sleeve 65 may be connected to the bottom of the interior surface of the refrigerator and may be comprised of the same material that is used for the interior surface of the refrigerator. The sleeve 65 may be comprised of three thin, rectangular pieces configured into the shape of a square tube where the fourth side is not present.

Figure 33:
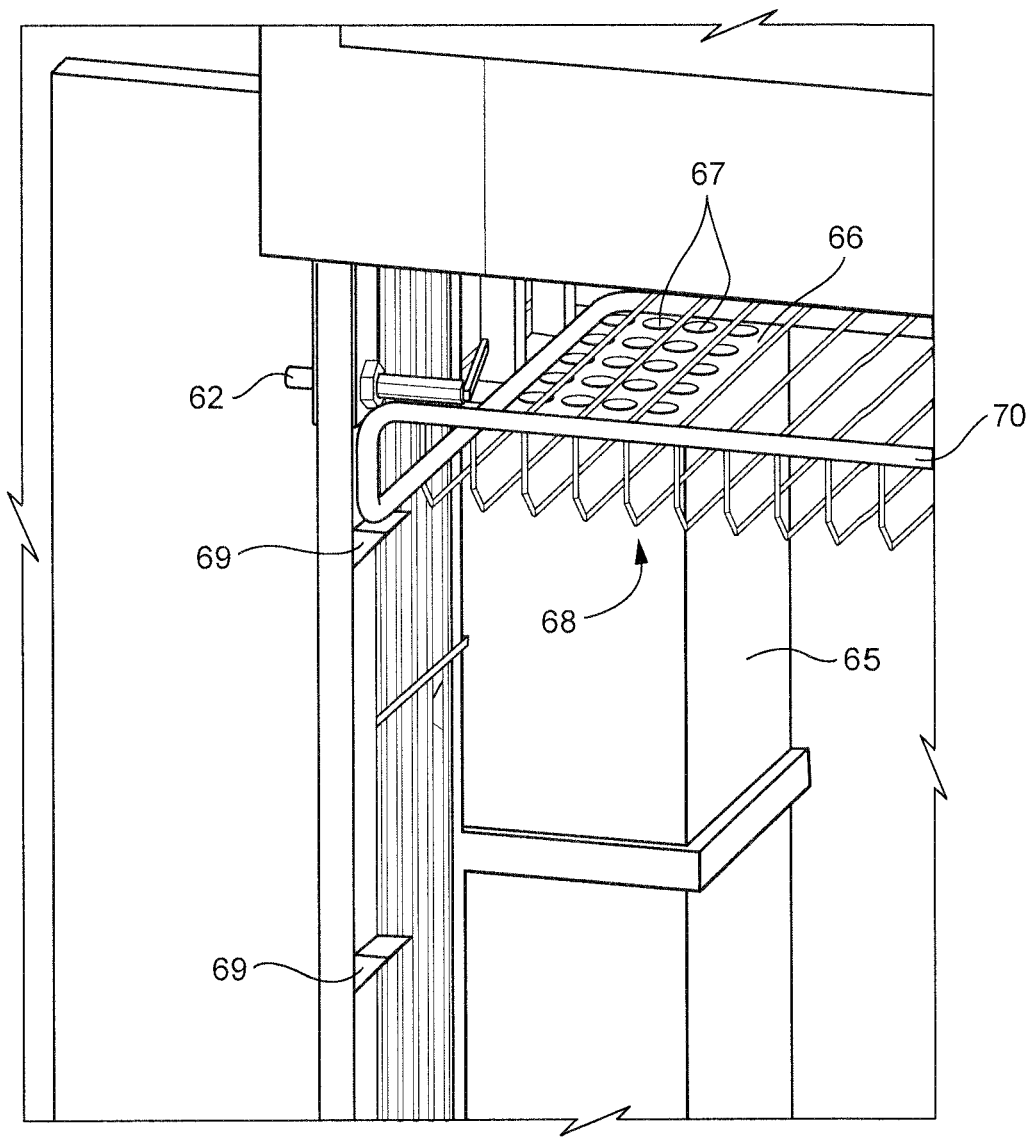
FIG. 33 schematically depicts an end cap plate including a grid pattern of the refrigerated space.
Figure 34:
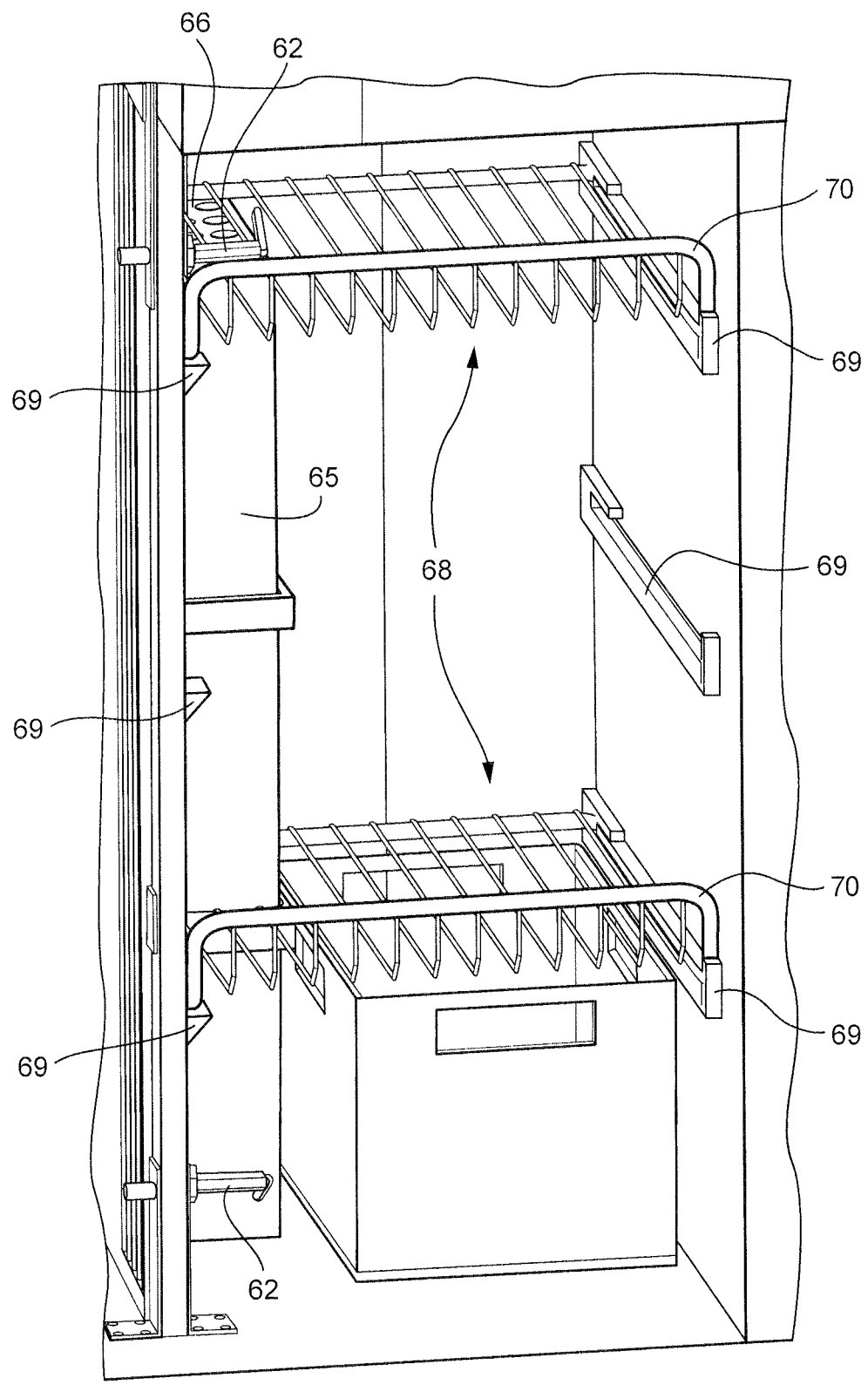
FIG. 34 schematically depicts the refrigerated space including an ice container.
Figure 35:
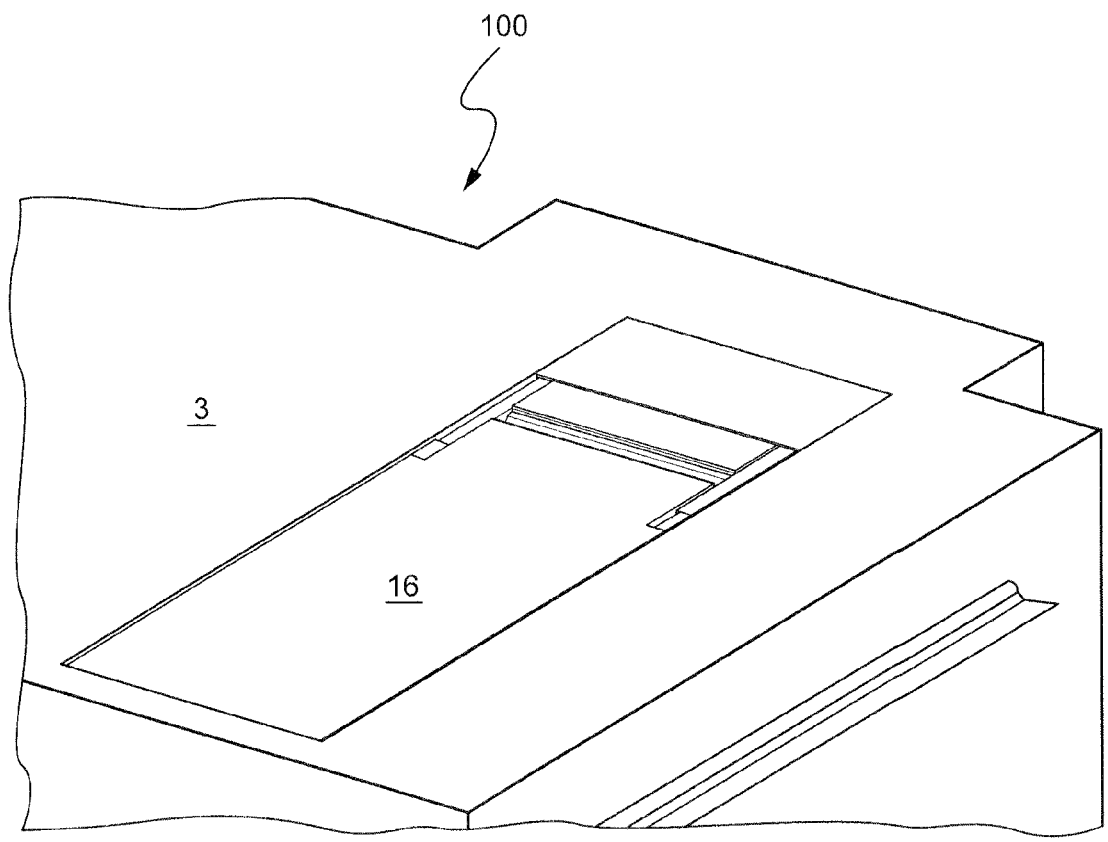
FIG. 35 schematically depicts a draft tower of the tailgating system in the closed position.

The sleeve 65 may be shorter than the interior height of the refrigerator and taller than the height of the carbon dioxide tank 58. At the top of the sleeve 65 an air circulation fan (not shown) may be connected. The air circulation fan may be mounted to the top of the three sides that comprise the sleeve 65. The fan is configured to circulate the air that is present within the interior 18 of the refrigerator 2. The top of the sleeve 65 may have an end cap plate 66 (FIGS. 33 and 34). The end cap plate 66 may connect to the three sides of the sleeve 65 and may be oriented in a horizontal direction. The air circulation fan may be connected to the bottom of the end cap plate 66. The end cap plate 66 may have a grid pattern of holes 67 through its surface so that air blown by the air circulation fan can pass through the end cap plate 66.

The interior 18 of the refrigerator 2 may also include a space for storage of refrigerated items. The refrigerated space 18 may comprise a shelf system 68 (FIGS. 28-34). Tabs 69 constructed from the same material as the interior of the refrigerator may extend out from the surface of the interior of the refrigerator. The tabs 69 can be configured to secure and hold racks 70 that can support the weight of refrigerated items. The racks 70 can be held by the tabs 69 with, for example, friction to prevent their movement. The racks 70 may be made of, for example, metal wire material. The racks 70 may be configured to allow the cool air present in the refrigerator interior 18 to pass through the racks 70. The tabs 69 can be configured to hold the racks 70 at multiple heights along the interior of the refrigerator. This allows the racks 70 to be positioned at different heights within the interior of the refrigerated space 18.

Figure 32:
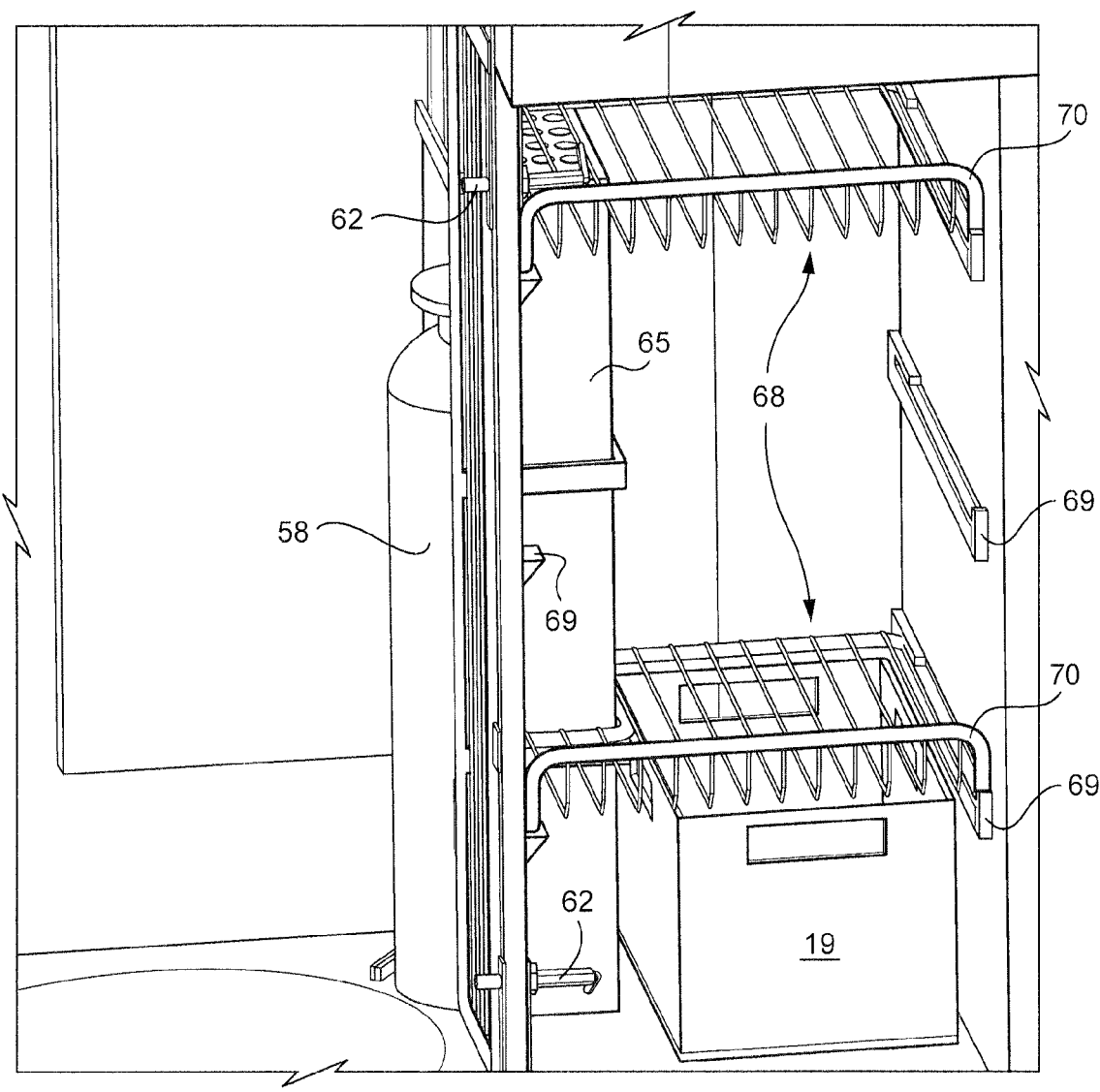
FIG. 32 schematically depicts an interior of the refrigerated space including a canister.

The interior of the refrigerated space 18 may also contain a space to hold a container, or bin, 19 for holding ice (FIGS. 32 and 34). The ice bin 19 may comprise two handles so that a person can hold the bin 19 by the handles, and the ice bin 19 can be removed from the interior of the refrigerated space 18.

Figure 36:
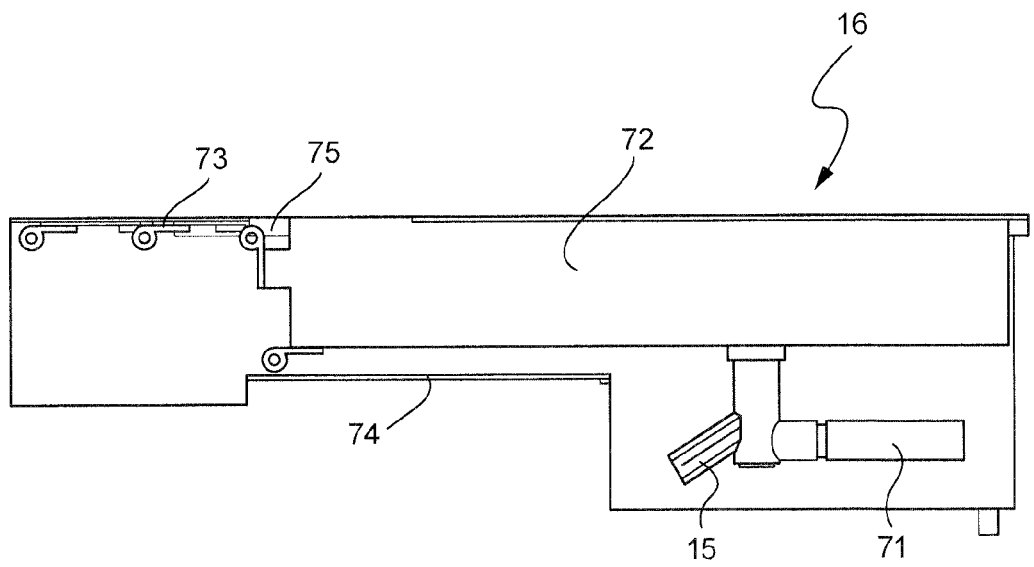
FIG. 36 schematically depicts a side view of the draft tower in the closed position.

Referring to FIGS. 35-39, the tailgating system may comprise a draft tower 16 that is configured to dispense beer from the keg 20 stored within the refrigerator 2. The draft tower 16 may comprise a valve 71, a tower box 72, a hinge plate 73, and a storage box 74. The storage box 74 of the draft tower 16 is placed on top of the tailgating system and a top of the storage box 74 is at the same height as the counter top 3 of the tailgating system (FIG. 36). The storage box 74 may be made of the same material that comprises the exterior surface of the tailgating system, e.g. aluminum panels. The storage box 74 may include a bottom and four sides while the top may be open with the exception of a small area at the back of the storage box 74. The tower box 72 may be a metal rectangular box comprised of the same material as the storage box 74. The tower box 72 may have the valve 71 mounted to the exterior surface of one of its sides. The tower box 72 may be connected to the storage box 74 by the hinge plate 73. When not in use, the tower box 72 can remain in the closed position. The closed position can place the tower box 72 within the storage box 74 where the side that is opposite the beer valve 71 faces up and is at the same height as the counter top 3 of the tailgating system. In the closed position, a gap 75 may be present between the tower box 72 and the top surface at the back of the storage box 74. The hinge plate 73 may be configured to cover this gap 75 so that there are no breaks in the countertop surface of the tailgating system. The hinge plate 73 may be comprised of two plates 76, 77 connected by a hinge 78 (FIG. 37). The hinge plate 73 is connected to the tower box 72 at the top edge by a hinge 79 and the top surface of the storage box 74 by a hinge 80 (FIG. 37). The hinge plate 73 may also be made of the same material used for the exterior surface of the tailgating system, and the hinge plate 73 is at the same height as the counter top 3 of the tailgating system when in the closed position (FIG. 36). In the closed position, the hinge plate 73 may also be in the horizontal position, similar to the top surface of the tower box 72 (FIG. 36).

Figure 39:
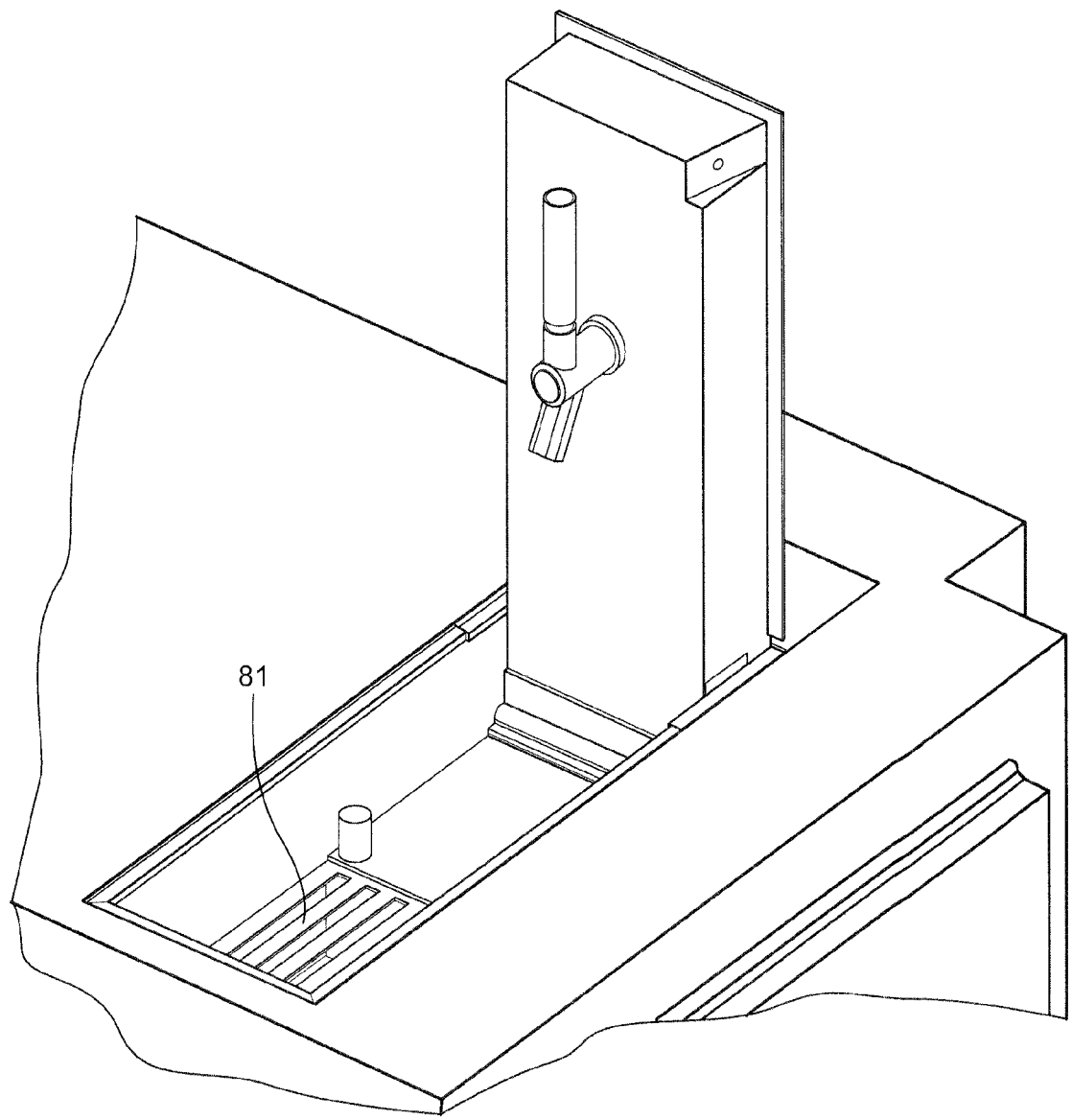
FIG. 39 schematically depicts a perspective view of the draft tower in the open position.

The storage box 74 may be configured with clearances for the depth of the tower box 72 and the valve 71. The storage box 74 may also be configured with clearances to accommodate the hinge plate 73 and the tower box 72 when the draft tower 16 is in the open position (FIGS. 38 and 39).

The draft tower 16 may be secured in the closed position by a locking mechanism. The draft tower 16 may be opened by unlocking the locking mechanism and rotating the tower box 72 up from the storage box 74 and around a hinge that connects the tower box 72 to the storage box 74. The tower box 72 can be rotated ninety degrees from a horizontal position to a vertical position. Another locking mechanism may be provided to lock the draft tower 16 in the open position. In the open position, the valve 71 is exposed and the surface it is mounted on is oriented vertically.

The action of moving the draft tower 16 from the closed to the open position may also act on the hinge plate 73. The act of rotating the tower box 72 may lower the corner of the tower box 72 where the hinge plate 73 is connected from the top to the bottom of the storage box 74. This can cause the hinge plate 73 to fold inside the storage box 74 and beneath the top surface of the storage box 74 (FIGS. 37 and 38).

In the open position, the interior of the storage box 74 is exposed. The clearance configured within the storage box 74 for the valve 71 may extend deeper into the interior of the tailgating system than the clearance configured for the tower box 72. Over this deeper clearance, a grate 81 may be pulled out from the storage box 74 to cover the deeper clearance (FIG. 39). The grate 81 may be configured so that liquid can pass through the grate. A drain tube is also configured to be placed at the bottom of the deeper clearance. The storage box 74 is configured to collect any excess liquid dispensed from the valve 71 and the pour spout 15 into this deeper clearance and remove it from the clearance with the drain tube.

Figure 40:
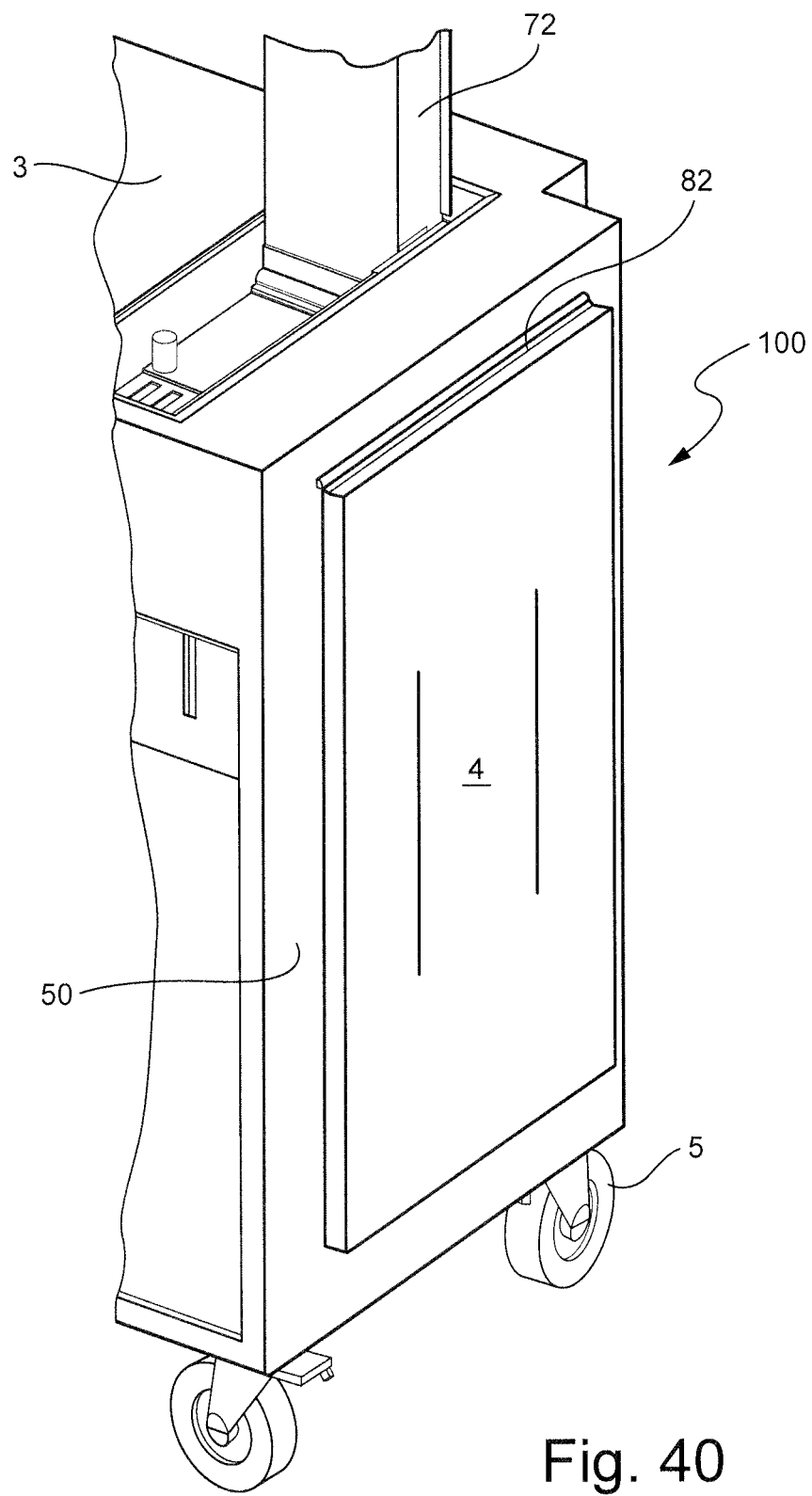
FIG. 40 schematically depicts a side table of the tailgating system in the stowed position.
Figure 41:
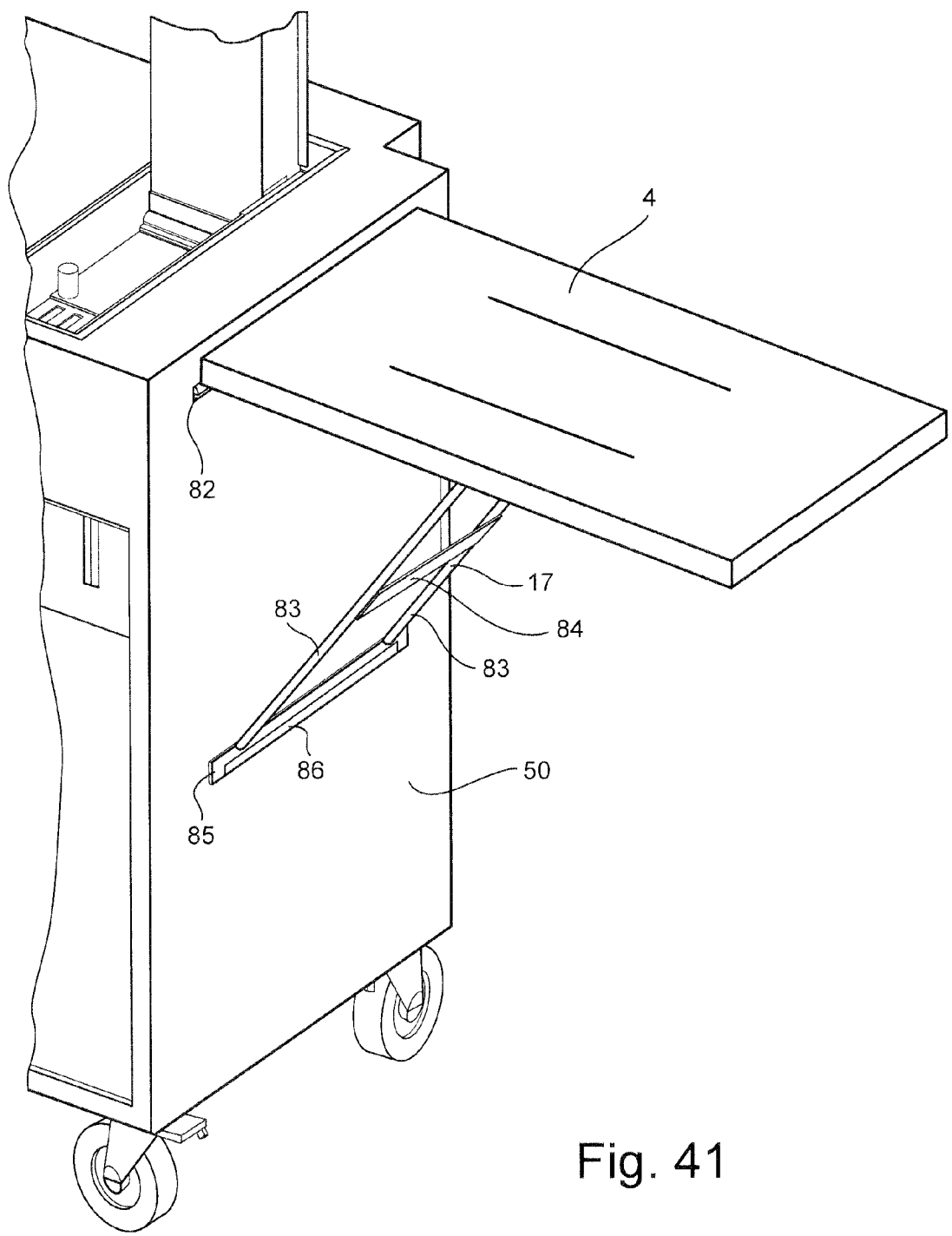
FIG. 41 schematically depicts the side table in the open position.
Figure 42:
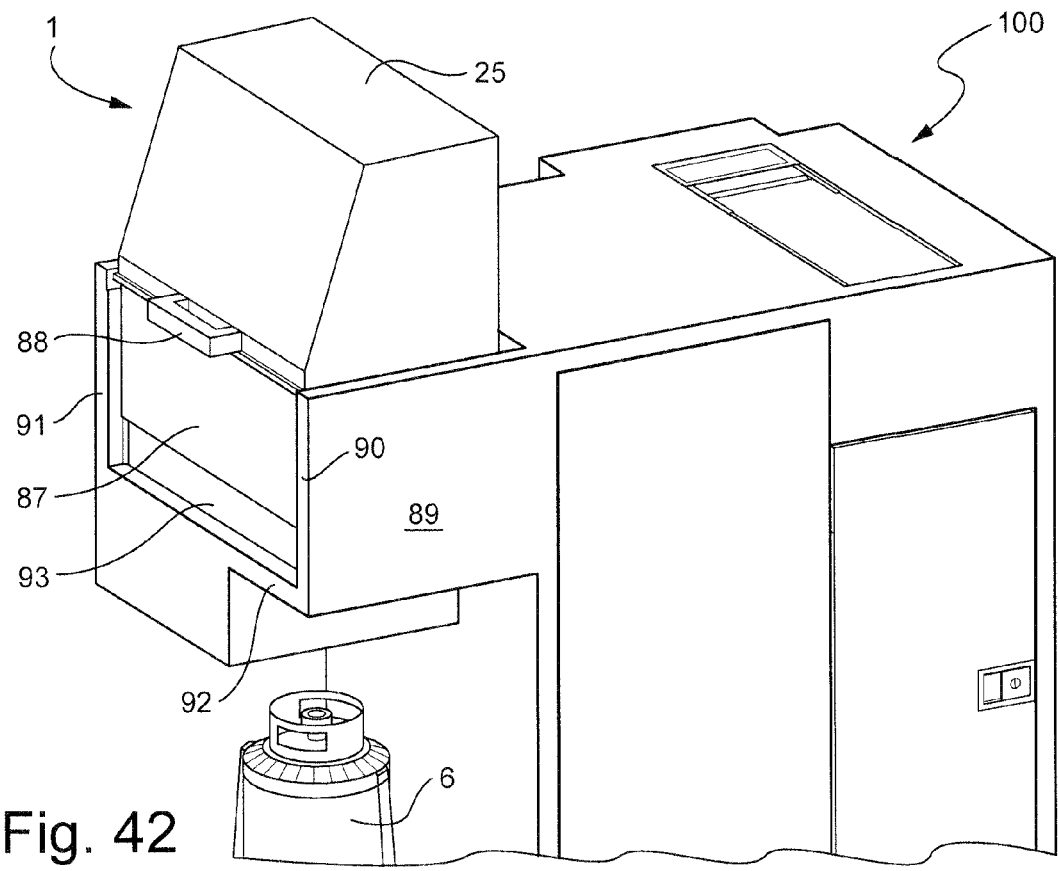
FIG. 42 schematically depicts a grill of the tailgating system in the closed position.

Referring to FIGS. 40 and 41, the tailgating system also may include the side table 4. The side table 4 may be constructed from material similar to the tailgating system, e.g. aluminum panels. The side table 4 may be rectangular. The side table 4 may be connected to the tailgating system by a hinge 82 that connects one side of the table 4 to a side wall of the tailgating system. The hinge 82 may be placed slightly below the top edge of the tailgating system. When the side table 4 is not in use it may be stowed next to the side of the tailgating system in a vertical fashion so that the top surface of the side table 4 is parallel to the side wall of the tailgating system. To prevent movement, a strap may secure the side table in the vertical position. The strap may be connected to the side wall and secured to the side table 4 with, for example, a button-snap connection. The end of the strap may include the female end of the button-snap, and the side of the side table 4 opposite the side with the hinge 82 may include the male end of the button-snap, or vice versa. The table may be secured in the stowed position when the button-snap connection is made.

The side table 4 may be moved to the open position by disconnecting the button-snap and rotating the table 4 up by rotating it away from the side wall and around the hinge 82. The side table 4 may be rotated ninety degrees from the vertical position to the horizontal position. The propping mechanism 17 can be positioned to secure the side table 4 in the open position.

While the side table 4 is in the stowed position, the propping mechanism 17 and the connection points for the propping mechanism 17 may be located between the side wall and the side table 4. The propping mechanism 17 can be configured to have two parallel rods 83 that extend to a connection point 86 on the side wall of the tailgating system and to a connection point on the bottom side of the side table 4. The bottom side of the side table 4 may be the side opposite the top of the side table 4 when it is in the horizontal open position. The propping mechanism 17 may be configured to have a rectangular piece 84 to connect the two parallel rods 83 of the propping mechanism 17 that keeps the rods 83 parallel to each other. The propping mechanism 17 may also comprise end rods 85 (only one shown in FIG. 41) that are made of the same material used to construct the parallel rods 83. The end rods 85 may connect the ends of the parallel rods 83 and may be perpendicular to the parallel rods 83. The connection points on the side wall of the tailgating system and the bottom of the side table 4 may be configured as hooks 86 that secure the end rods 85 of the propping mechanism 17 when the side table 4 is moved to the open position. The propping mechanism 17 may be oriented at, for example, a forty-five degree angle relative to the side wall of the tailgating system when it is propping the side table 4 in the open position. The hooking action of the connection points 86 can prevent the propping mechanism 17 from sliding along the side wall of the tailgating system and along the bottom side of the side table 4. This can prevent the side table 4 from rotating from the open position to the stowed position. When the side table 4 is in the open position the height of the table surface may be equal to the height of the counter top 3.

When the side table 4 is stowed in the vertical position and the propping mechanism 17 is stowed between the side table 4 and the side wall, the propping mechanism 17 can be secured in place by hanging the propping mechanism 17 vertically on the hook 86 on the side wall. The propping mechanism 17 can be secured vertically by the rectangular piece 83 being engaged by the hook 86. The connection point hook 86 on the side wall can prevent the rectangular piece 83, and the entire propping mechanism 17, from falling off of the tailgating system.

Referring to FIGS. 42-48, the tailgating system 100 may also comprise a grill 1 that is supplied by a gas, e.g. propane, tank 6. The grill 1 can be configured to have a bottom section 87 that holds the burners and a top hood 25 that is connected to the bottom section 87 by a hinge connected at the back top edge of the bottom section 87. The bottom section 87 may comprise a rectangular box having an open top. Inside the bottom section 87 a burner assembly may be mounted. The bottom section 87 can also hold the grill grate 24 (FIG. 6) which can be held up to a height equal to the height of the top of the bottom section 87 by tabs that extend from the interior of the side walls of the bottom section 87.

The top hood 25 may be formed of the same material used for the bottom section 87, but the top hood 25 does not include a burner assembly, a grill grate 24, or tabs to hold a grill grate. Additionally, the top hood 25 may be oriented in the opposite fashion of the bottom section 87 where the bottom is open and the top is closed. The top hood 25 may have a handle 88 on the front exterior side wall to facilitate opening and closing the grill 1. The grill hood 25 can be in the closed position (FIGS. 42-47) when the side walls of the top hood 25 and the side walls of the bottom section 87 are in contact with each other. The top hood 25 may have a lipped edge around the perimeter that is made by the side walls.

The tailgating system may comprise a section that holds the grill 1. On the side wall of the tailgating system opposite the side where the side table 4 can be attached, a cabinet 89 to hold the grill can be attached. The cabinet 89 may be formed of the same material used to construct the tailgating system, e.g. aluminum panels. The cabinet 89 may comprise two side walls 90, 91. The side walls 90, 91 can extend out from the side wall of the tailgating system. The top of the side walls 90, 91 can be at the same height as the counter top 3, and they may extend down to an elevation that is approximately half as high as height of the tailgating system. A third, bottom, wall 92 may also make up the cabinet 89. The bottom wall 92 may be made of the same materials used to construct the tailgating system. The third wall 92 may connect the bottom sides of the two side walls 90, 91, can be oriented horizontally, and can extend from the side wall of the tailgating system to the end of the side walls 90, 91. The cabinet 89 may be open on the top and the front and the interior dimensions are configured to accommodate the bottom section 87 of the grill 1. The front of the grill 1 is the on the side of the tailgating system.

Below the grill 1 a rectangular plate 93 can be connected to the bottom section 87. The rectangular plate 93 may be made of the same material used for the walls of the cabinet 89 and it may be oriented vertically. The rectangular plate 93 can prevent access to the area immediately below the bottom section 87 and behind the rectangular plate 93 when a user tries to access that location from the same side as the front of the grill 1. The area below the bottom section 87 and behind the rectangular plate 93 can not be accessed by the sides or by the bottom because the access is prevented by the bottom wall 92 and side walls 90, 91 of the grill cabinet 89.

Below the bottom section 87 and behind the rectangular plate 93, the gas valve 23 may be located that can regulate the flow of gas to the burner assembly from the gas tank 6. A hose may run from the gas tank 6 to the gas valve 23 and the gas valve 23 may be connected to the burner assembly by, for example, a pipe 94.

Figure 43:
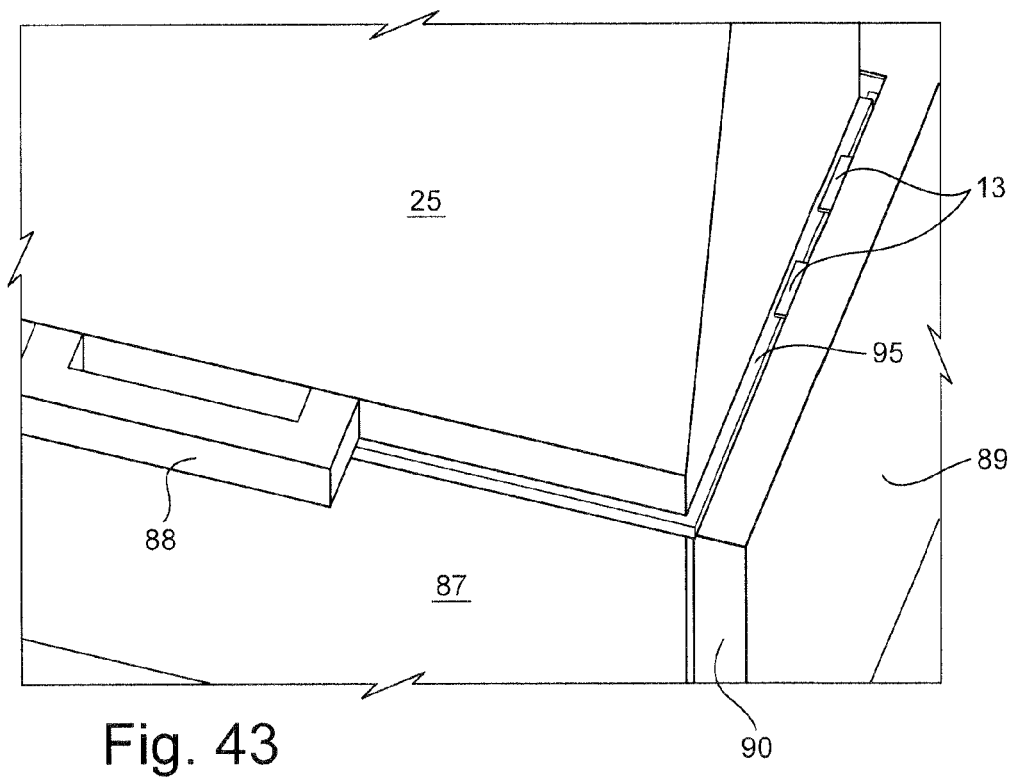
FIG. 43 schematically depicts the grill in the closed position with retainer tabs.
Figure 44:
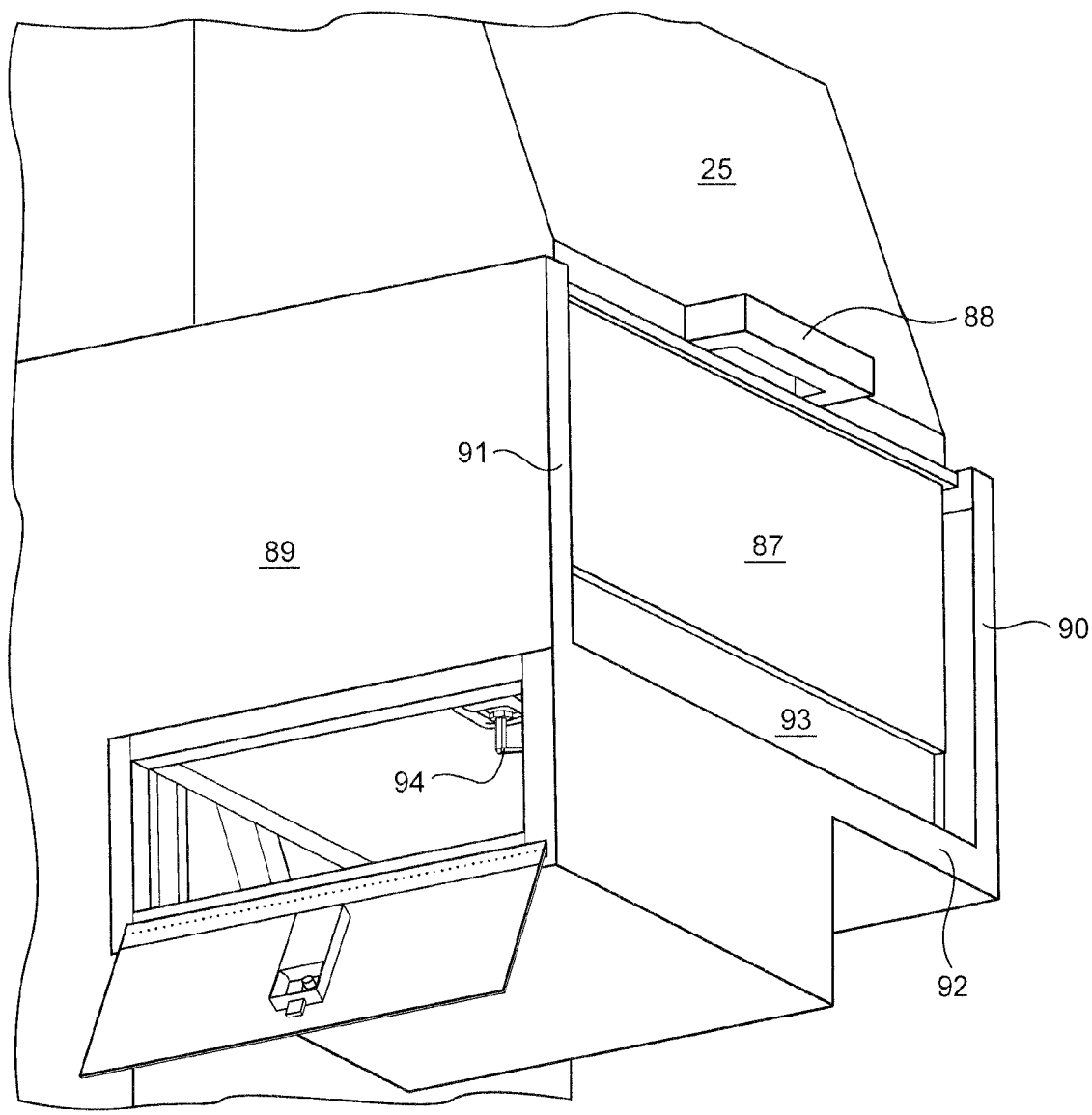
FIG. 44 schematically depicts a dry storage cabinet of the tailgating system in the open position.
Figure 45:
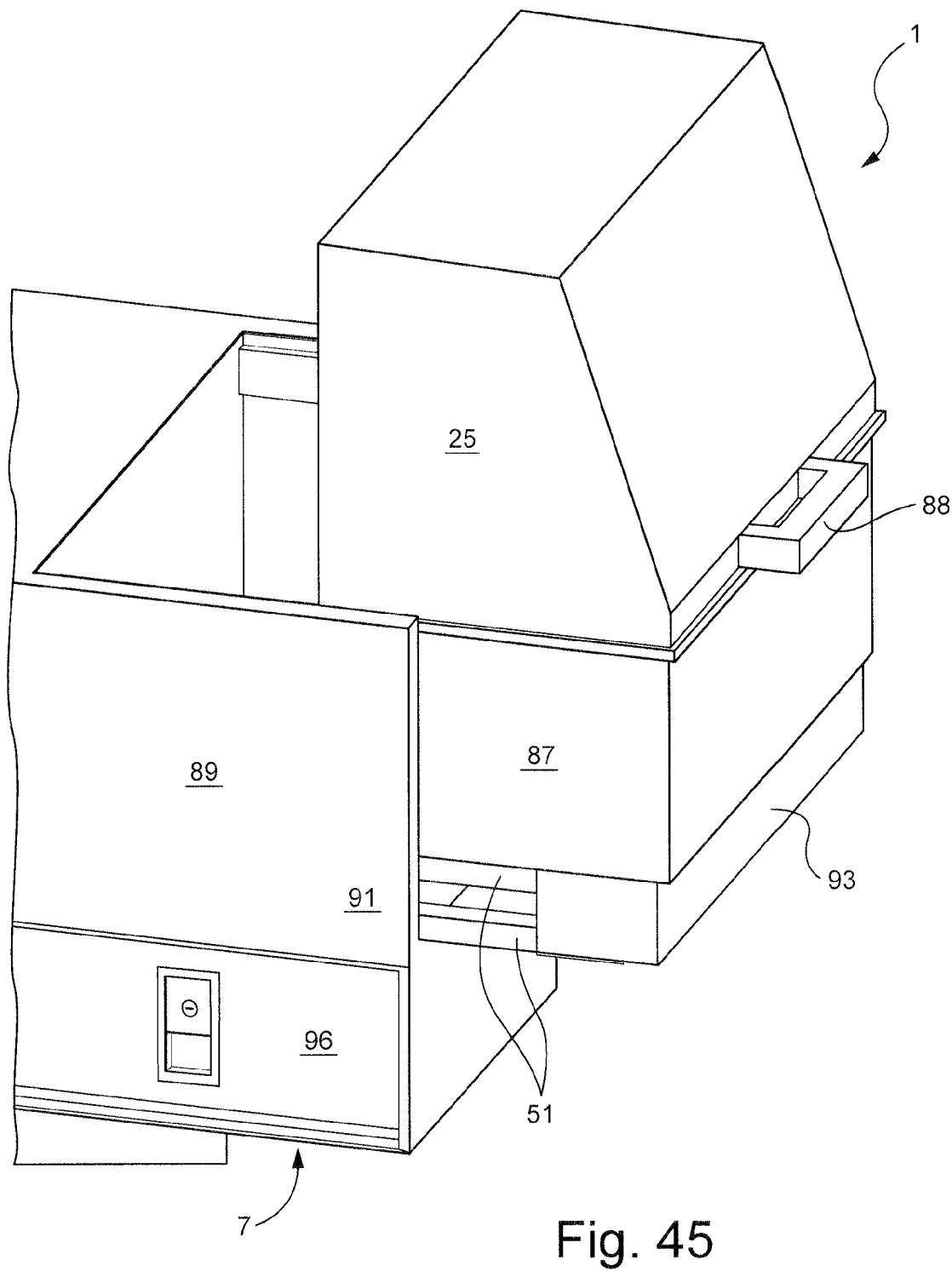
FIG. 45 schematically depicts the grill in the open position.
Figure 46:
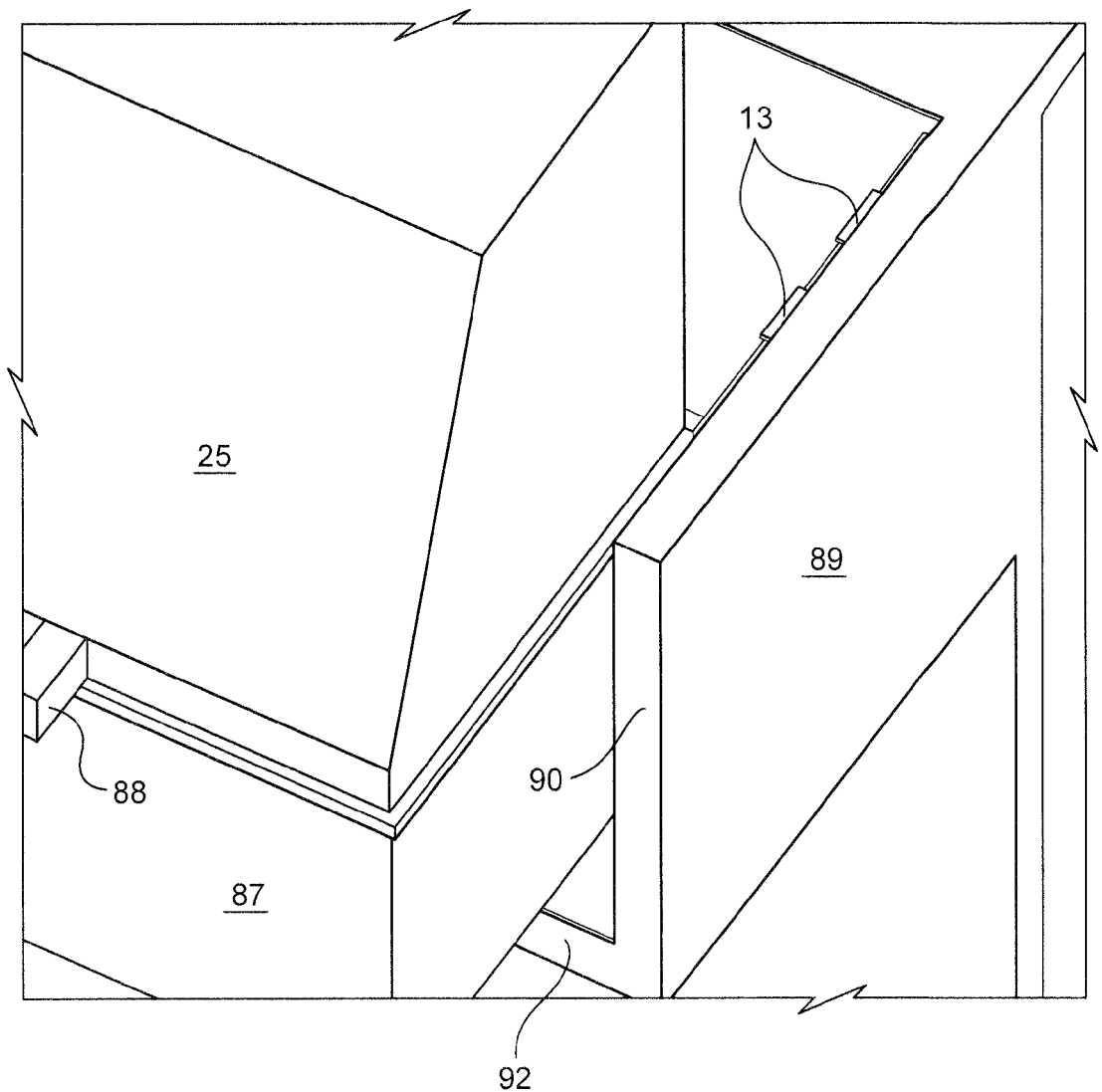
FIG. 46 schematically depicts the grill in the open position and clear of the retainer tabs.
Figure 47:
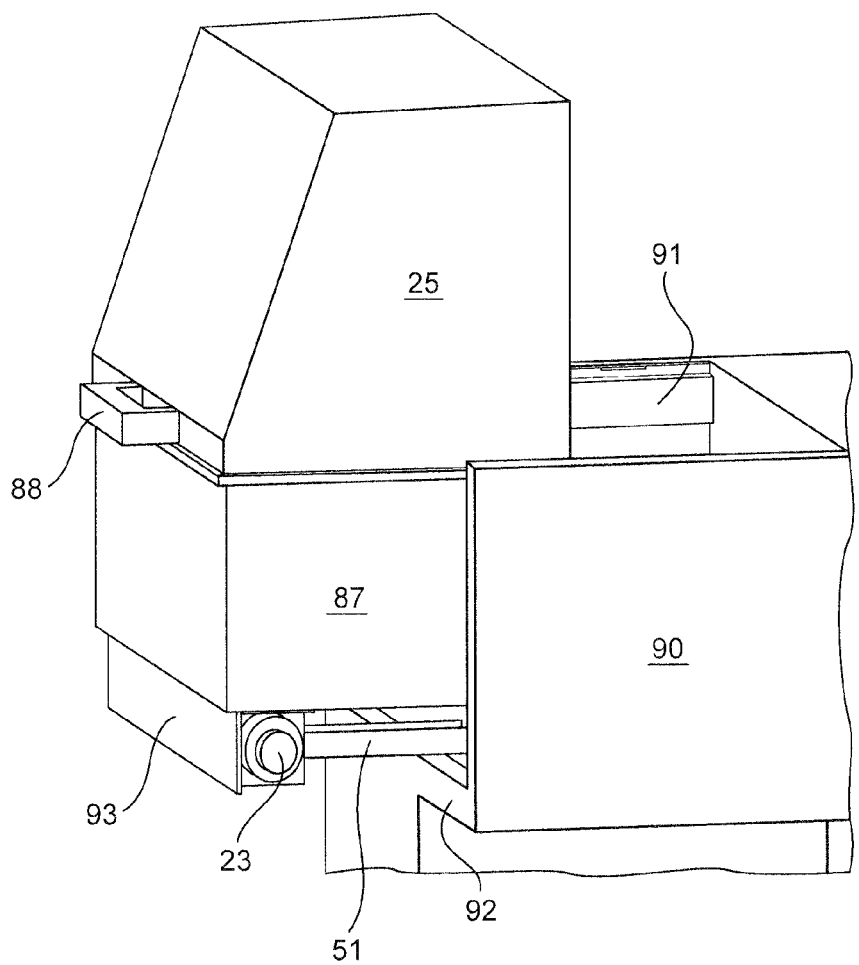
FIG. 47 schematically depicts the grill in the open position and the gas valve exposed.
Figure 48:
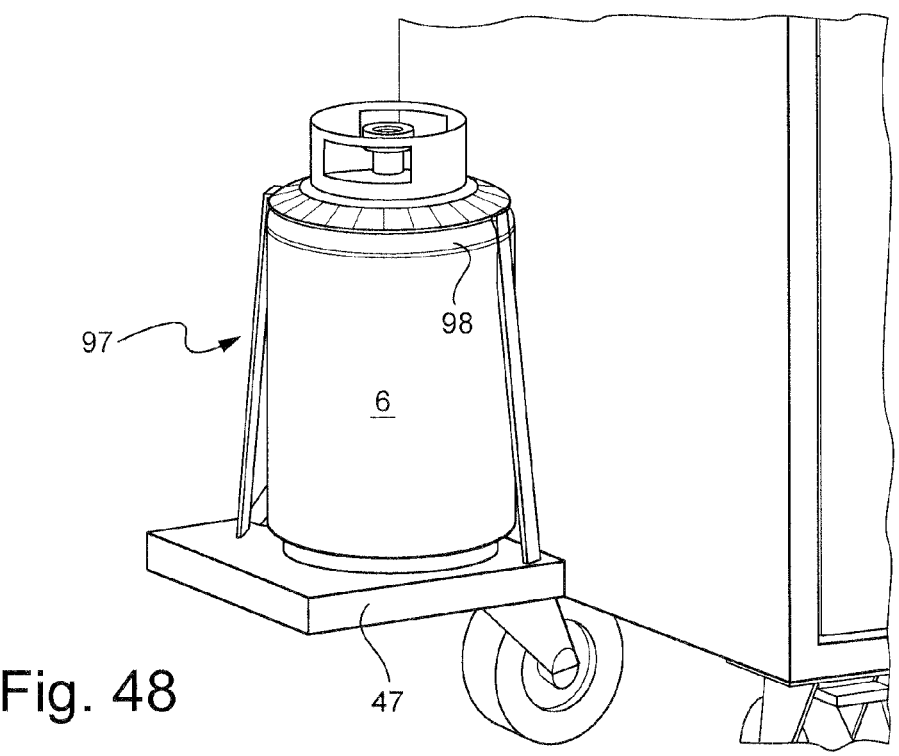
FIG. 48 schematically depicts a gas tank shown secured to a platform of the tailgating system via a collar strap.
Figure 49:
FIG. 49 schematically depicts a storage space of the tailgating system with an exterior wall in place.
Figure 50:
FIG. 50 schematically depicts the storage space without the exterior wall in place.

The grill 1 may be connected to the grill cabinet 89 by cabinet drawer sliders 51. The cabinet drawer sliders 51 may be connected to the left and right side of the bottom section 87 of the grill 1 and the side walls 90, 91 of the grill cabinet 89. The cabinet drawer sliders 51 may allow the grill 1 to be pulled in and out of the front of the grill cabinet 89. The grill 1 may be in the use position when it is pulled out (FIGS. 45-47) and in the stowed position when it is pushed into the grill cabinet 89 (FIGS. 43 and 44).

Attached to the interior of the side walls 90, 91 of the grill cabinet 89 can be retainer tabs 13. The retainer tabs 13 may be positioned on the interior of the side walls 90, 91 at a height slightly above the lipped edge 95 of the top hood 25 of the grill. The retainer tabs 13 may also hang over the lipped edge 95. When the grill 1 is in the stowed position the top hood 25 can not be opened. The retainer tabs 13 may be configured to interfere with the lipped edge 95 of the top hood 25 and prevent it from rotating back. The retainer tabs 13 and the bottom section 87 of the grill can secure the top hood 25 and prevent access to the grill grate 24. When the grill 1 is pulled out and in the use position, the grill 1 can slide past the retainer tabs 13 and the retainer tabs 13 may not interfere with the top hood 25. The top hood 25 can be opened only when the grill is pulled out.

A dry storage cabinet 7 may be located below the grill cabinet 89. The top of the cabinet 7 may be the bottom wall 92 of the grill cabinet 89 and one of its side walls 91 may be a portion of the side wall of the dry storage cabinet 7. The dry storage cabinet 7 may have a locking door 96 that is located on a side of the cabinet 7 that is on the same side of one of the walls 91 of the grill cabinet 89. Relative to the front of the grill cabinet 89, the dry storage cabinet 7 may be accessed from the side. The dry storage cabinet 7 and its locking door 96 may be made of the same material as the grill cabinet 89, e.g. aluminum panels. The interior of the dry storage cabinet 7 may include a latching pin similar to the pin 62 used for the left refrigerator door 22 (FIG. 22). The latching pin can be accessed and acted upon only when the dry storage cabinet's locking door 96 is opened. The latching pin can pass through the bottom of the grill cabinet 89.

The latching pin of the dry storage cabinet 7 may interlock with a latching tab that extends from the bottom side of the bottom section 87 of the grill 1. The latching tab and its interaction with the latching pin are configured similar to that used for the left refrigerator door 22. When the latching pin is interlocked with the latching tab, the latching pin prevents the grill 1 from sliding out of the grill cabinet 89. Only when the latching pin is acted on can the grill be pulled out and the grill grate 24 (FIG. 6) accessed by lifting the top hood 25.

The gas valve 23 may be located below the bottom section 87 of the grill 1, behind the rectangular plate 93, and connected to the bottom of the bottom section 87. The gas valve 23 can not be accessed when the grill 1 is in the stowed position, and can only be accessed when the grill 1 is pulled out of the grill cabinet 89 and in the use position. The gas valve 23 may be oriented immediately below the bottom section 87 of the grill 1 and on the side of the bottom section 87. When the grill 1 is in the stowed position, the gas valve 23 can be covered by the side wall 90 of the grill cabinet 89. When the grill 1 is pulled out, the grill may slide past the side wall 90 of the grill cabinet 89 and the gas valve 23 may be exposed, in addition to the side of the bottom section 87 of the grill 1.

The grill 1 of the tailgating system may be a propane grill that is configured to be supplied by a propane tank that is configured to be stored on the tailgating system. A mount, or platform, 47 may extend from the side wall of the tailgating system. The platform 47 can extend from the same side wall that the grill cabinet 89 is attached to. The platform 47 may be made from the same material that comprises the exterior surface of the tailgating system, e.g. aluminum panels. The platform 47 can be oriented in a horizontal direction, configured as a square area, although it may have another shape, and can be positioned on the side wall of the tailgating system at a height similar to the height of the bottom of the tailgating system and the top of the castor wheels 5. The platform 47 may be configured to support the weight of the tank 6. The tank 6 may be secured to the platform 47 with a collar strap 97. The collar strap 97 may comprise a circular collar 98 that fits over the top of the tank 6. The collar strap 97 may also include two straps 99 that extend from the circular collar 98. The straps 99 may be located on opposite sides of the circular collar 98 and extend in opposite directions away from the center of the circular collar 98. The straps 99 may extend from the top of the tank 6 where the circular collar 98 is positioned on the tank 6 to the platform 47. One strap may be configured to be permanently connected to the platform 47 while the other strap may be configured to be connected to and disconnected from the platform 47. The straps 99 may connect to two opposite sides on the sides of the platform 47. The strap 99 that is configured to be connected and disconnected may be secured to the platform 47 with a button-snap connection that is similar in design to the button-snap connection used to secure the side table 4 (FIG. 40) in the stowed position. The straps 99 may be configured to be under tension so that the tank 6 is held securely against the platform 47.

The tailgating system may also be provided with a space to store components that support the various features the tailgating system is configured to perform. The tailgating system may be configured with a space to hold equipment that supplies and manages electricity for use and equipment that supports the operation of the refrigerator. The space in the tailgating system may be made from materials similar to those used for the tailgating system and is configured to integrate within the extents of the system. The space may be provided with shelves that can accommodate equipment and machinery. The shelves may also be made from materials similar those materials used for the cabinet apparatus. The space is ventilated with holes that are configured into the exterior walls that surround the space.

While the tailgating system has been described in connection with what are presently considered to be the most practical and preferred sample embodiments, it is to be understood that the tailgating system is not to be limited to the disclosed embodiments, but on the contrary, is intended to cover various modifications and equivalent arrangements included within the spirit and scope of the tailgating system. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A tailgating system for attachment to a transport vehicle, the tailgating system comprising:
    a cabinet configured to include a refrigerator, a draft system, and/or a dry storage cabinet; and
    a movable hitch assembly comprising a hitch coupling configured to be coupled to a hitch mount assembly connectable to the transport vehicle, wherein the hitch coupling is configured to move up and down relative to the cabinet to raise and lower the cabinet when the hitch assembly is coupled to the transport vehicle via the hitch mount assembly, wherein the hitch assembly comprises a linear actuator connected to the hitch coupling by a guide block, the guide block comprising a track wheel at each end, and each track wheel being received in a guide track attached to the cabinet.

2. A tailgating system according to claim 1, further comprising:
    an electric motor configured to drive the linear actuator.

3. A tailgating system according to claim 1, wherein the hitch mount assembly comprises a first elongated member configured for attachment to a hitch of the transport vehicle, and a second elongated member perpendicular to the first elongated member, the second elongated member having a first end a first distance from the first elongated member and a second end a second distance from the first elongated member, wherein the first distance is greater than the second distance.

4. A tailgating system according to claim 3, wherein the first and second ends of the second elongated member each comprise a connection point configured to receive the hitch coupling of the hitch assembly.

5. A tailgating system according to claim 3, further comprising:
    a securing sleeve configured to prevent movement of the tailgating system while the tailgating system is mounted to the hitch mount assembly and to the vehicle, wherein the securing sleeve is configured to receive the second elongated member of the hitch mount assembly and comprises at least one pair of opposed sleeve holes configured to align with at least one pair of hitch mount holes in the second elongated member, and the securing sleeve is connectable to the hitch mount assembly by aligning the at least one pair of opposed sleeve holes and the at least one pair of hitch mount holes with one another and inserting a pin through each aligned pair of opposed sleeve holes and pair of hitch mount holes.

6. A tailgating system according to claim 1, further comprising:
    a side table pivotably attached to the cabinet and movable from a first, stowed position adjacent the cabinet to a second, open position wherein the side table is flush with a counter top surface of the cabinet;
    a propping mechanism configured to maintain the side table in the second position; and
    at least one connection point configured to secure the propping mechanism to the cabinet, wherein the at least one connection point is configured to secure the propping mechanism to the cabinet when the side table is in the first position or the second position.

7. A tailgating system according to claim 1, further comprising:
    a grill, wherein the grill is movably mounted to the cabinet.

8. A tailgating system according to claim 7, wherein the grill comprises a bottom section comprising at least one burner and a hood pivotably attached to the bottom section, wherein the grill is movable via sliding shelf rails.

9. A tailgating system according to claim 8, further comprising a gas valve configured to connect the bottom section to a gas supply, wherein the gas valve is inaccessible when the bottom section is in a first position adjacent a side wall of the cabinet, and accessible when the bottom section is in a second position wherein the sliding shelf rails extend from the cabinet.

10. A tailgating system according to claim 9, wherein the cabinet comprises retaining tabs configured to prevent opening of the hood when the grill is in the first position.

11. A tailgating system according to claim 1, wherein when the cabinet is configured to include the dry storage cabinet, the dry storage cabinet comprises a latched door.

12. A tailgating system according to claim 1, wherein the draft system comprises a draft tower pivotably attached to the cabinet, the draft tower comprises a tower housing and a valve and a pour spout in the tower housing, and a portion of the draft tower is flush with a counter top of the cabinet in a closed position and perpendicular to the counter top in an open position.

13. A tailgating system according to claim 1, further comprising an electrical power source and at least one electrical outlet operatively connected to the electrical power source.

14. A tailgating system according to claim 1, wherein the cabinet is configured to include a refrigerator, a draft system, and a dry storage cabinet.

15. A tailgating system according to claim 1, wherein the cabinet includes ventilation structure.

16. A tailgating system according to claim 1, further comprising:
    a plurality of wheels.

17. A tailgating system according to claim 16, wherein the plurality of wheels are castor wheels.

18. A tailgating system for attachment to a transport vehicle, the tailgating system comprising:
    a cabinet including a refrigerator; and
    a movable hitch assembly comprising a hitch coupling configured to be coupled to a hitch mount assembly connectable to the transport vehicle, wherein the hitch coupling is configured to move up and down relative to the cabinet to raise and lower the cabinet when the hitch assembly is coupled to the transport vehicle via the hitch mount assembly,
    wherein the refrigerator comprises a refrigerated space that comprises a first space and a second space, wherein the first space is configured to store a keg and a pressurized canister and the second space is configured to support at least one shelf, further wherein the refrigerator comprises a first door and a second door configured to close the first space and the second space, respectively, wherein the first door is hinged to the cabinet along a first side and the second door is hinged to the first door along a second side of the first door that is opposite the first side, wherein the movable hitch assembly comprises a linear actuator, wherein the linear actuator is connected to the hitch coupling by a guide block, the guide block comprising a track wheel at each end, and each track wheel being received in a guide track attached to the cabinet.

19. A tailgating system according to claim 18, wherein the first door comprises at least one latch tab on the second side.

20. A tailgating system according to claim 19, further comprising at least one latch configured to releasably engage the latch tab to maintain the first door in a closed position in an engaged position and to allow opening of the first door in a disengaged position.

21. A tailgating system according to claim 18, wherein the cabinet is further configured to include a draft system and/or a dry storage cabinet.

22. A tailgating system for attachment to a transport vehicle, the tailgating system comprising:

a cabinet including a draft system; and a hitch assembly comprising a hitch coupling configured to be coupled to a hitch mount assembly connectable to the transport vehicle, wherein the draft system comprises a tower pivotably mounted to the cabinet and a valve and a pour spout connected to the tower, and a portion of the draft system is flush with a counter top of the cabinet in a closed position and the portion of the tower extends above the counter top in an open position, wherein the hitch assembly is movable and comprises a linear actuator, and wherein the linear actuator is connected to the hitch coupling by a guide block, the guide block comprising a track wheel at each end, and each track wheel being received in a guide track attached to the cabinet.

23. A tailgating system according to claim 22, wherein the portion of the draft system is a side of the tower.

24. A tailgating system according to claim 22, wherein the hitch assembly further comprises an electric motor configured to drive the linear actuator.

25. A tailgating system according to claim 22, wherein the cabinet is further configured to include a refrigerator and/or a dry storage cabinet.

\* \* \* \* \*